United States Patent
Svantesson

(10) Patent No.: US 12,354,327 B2
(45) Date of Patent: Jul. 8, 2025

(54) APPARATUS AND METHODS FOR GENERATING EDGE GROUND TRUTH DATA FOR A FEDERATED SYSTEM ARCHITECTURE USING MACHINE LEARNING PROCESSES

(71) Applicant: Arriver Software AB, Linköping (SE)

(72) Inventor: Thomas Svantesson, Linköping (SE)

(73) Assignee: QUALCOMM Incorporated, San Diego, CA (US)

( * ) Notice: Subject to any disclaimer, the term of this patent is extended or adjusted under 35 U.S.C. 154(b) by 442 days.

(21) Appl. No.: 17/946,854

(22) Filed: Sep. 16, 2022

(65) Prior Publication Data

US 2024/0096058 A1     Mar. 21, 2024

(51) Int. Cl.
*G06V 10/764*     (2022.01)
*G06V 10/26*      (2022.01)

(52) U.S. Cl.
CPC ............ *G06V 10/764* (2022.01); *G06V 10/26* (2022.01)

(58) Field of Classification Search
CPC ....... G06V 10/764; G06V 10/26; G06N 20/00
See application file for complete search history.

(56) References Cited

U.S. PATENT DOCUMENTS

| | | | |
|---|---|---|---|
| 11,922,368 B1 * | 3/2024 | Wozniak | G06N 20/20 |
| 11,941,493 B2 * | 3/2024 | Desmond | G06N 20/00 |
| 2020/0286002 A1 * | 9/2020 | Szanto | G06N 20/20 |
| 2020/0334524 A1 | 10/2020 | Sprague et al. | |
| 2022/0092414 A1 * | 3/2022 | Zheng | G06N 3/08 |
| 2022/0414528 A1 * | 12/2022 | Chhibber | G06N 5/045 |
| 2023/0342662 A1 * | 10/2023 | Ni | G06F 18/2415 |
| 2024/0359621 A1 * | 10/2024 | Jagbrant | G08G 1/0112 |
| 2024/0394556 A1 * | 11/2024 | Shao | G06F 9/48 |

OTHER PUBLICATIONS

Ahn J-H., et al., "Federated Active Learning (F-AL): An Efficient Annotation Strategy for Federated Learning", Arxiv.Org, Cornell University Library, 201 Olin Library Cornell University Ithaca, NY14853, arXiv:2202.00195v1 [cs.LG], Feb. 1, 2022, XP091148133, 13 pages, abstract, figure 1 and 9, sections 1-5.3 and 5.5 and Algorithms 1-3.

(Continued)

*Primary Examiner* — John B Strege
(74) *Attorney, Agent, or Firm* — Polsinelli/Qualcomm

(57) ABSTRACT

Methods, systems, and apparatuses to update or retrain a trained machine learning model/process based on edge ground truth data generated by edge devices. For example, a computing device may obtain, from a database, a first dataset of a first trained machine learning process and a second dataset of a second trained machine learning process. The first dataset may include at least a first value of a parameter of the first trained machine learning process. Additionally, the computing device may transmit, to a first edge device of a plurality of edge devices, a message including the first dataset and the second dataset. Further, the computing device may receive, from the first edge device, a third dataset associated with the message, and update a portion of the first dataset with the third dataset. The updated portion of the first dataset may include an updated value of the parameter.

28 Claims, 9 Drawing Sheets

(56) References Cited

OTHER PUBLICATIONS

Cho J. W., et al., "MCDAL: Maximum Classifier Discrepancy for Active Learning", Arxiv.Org, Cornell University Library, 201 Olin Library Cornell University Ithaca, NY14853, arXiv:2107.11049v2 [cs.CV], Feb. 14, 2022, XP091155294, pp. 1-11, the whole document.
International Search Report and Written Opinion—PCT/IB2023/000442—ISA/EPO—Dec. 11, 2023.
Xu D., et al., "Edge Intelligence: Empowering Intelligence to the Edge of Network", Proceedings of the IEEE, IEEE. New York, US, vol. 109, No. 11, Nov. 2, 2021, pp. 1778-1837, XP011886614, pp. 1-60, the whole document.

* cited by examiner

APPARATUS AND METHODS FOR GENERATING EDGE GROUND TRUTH DATA FOR A FEDERATED SYSTEM ARCHITECTURE USING MACHINE LEARNING PROCESSES

FIELD OF DISCLOSURE

The disclosed embodiments generally relate to machine learning processes and, more particularly, to machine learning processes within image recognition systems.

BACKGROUND

In various examples, a vehicle may include computing system and a suite of sensors that enables the vehicle to "sense" and/or identify one or more objects that are in an environment the vehicle is in. In such examples, the computing system of the vehicle may utilize a machine learning process trained by a centralized datacenter to "sense" and/or identify the one or more objects. However, if the vehicle encounters new objects, such as new traffic signs or new traffic lights, the trained machine learning process may not be able to identify the new object. In such circumstances, the computing system may forward sensor data of the new object(s) to the centralized database so that the centralized database may update/retrain the trained machine learning process to recognize the new object(s). However, such a computing environment may enable sensitive data and information to be transmitted to the centralized database and may not be allowed in certain data privacy sensitive countries where the centralized database is outside of those particular countries. The same issue is also encountered if a data collection campaign is conducted to collect samples of new objects(s) in those countries

SUMMARY

According to one aspect an apparatus may comprise a communications interface, a non-transitory, machine-readable storage medium storing instructions, and at least one processor coupled to the communications interface, and the non-transitory, machine-readable storage medium. The at least one processor may be configured to obtain, from a database, a first dataset of a first trained machine learning process associated with a first type of object detection and recognition and a second dataset of a second trained machine learning process associated with a second type of object detection and recognition. In some examples, the first dataset including at least a first value of a parameter of the first trained machine learning process. Additionally, the at least one processor may be configured to transmit, to a first edge device of a plurality of edge devices via the communications interface, a message including the first dataset and the second dataset. In some examples, the message may cause the first edge device to apply the first trained machine learning process to sensor data in accordance with the first dataset, apply the second trained machine learning process to the sensor data in accordance with the second dataset, generate first ground truth data based on the application of the first trained machine learning process to the sensor data, generate second ground truth data based on the application of the second trained machine learning process to the sensor data, and perform operations that retrain the first trained machine learning process based in part on the first ground truth data and the second ground truth data. In some instances, the retrained first trained machine learning process may be associated with a second value of the parameter of the first trained machine learning process. Moreover, the message may cause the first edge device to generate a third dataset including the second value of the parameter. Further, the at least one processor may be configured to receive, from the first edge device, the third dataset, and update a portion of the first dataset with the third dataset. In some examples, the updated portion of the first dataset may include the second value of the parameter.

According to another aspect a non-transitory, machine-readable storage medium storing instructions that, when executed by at least one processor of a server, causes the at least one processor to perform operations that include obtaining, from a database, a first dataset of a first trained machine learning process associated with a first type of object detection and recognition and a second dataset of a second trained machine learning process associated with a second type of object detection and recognition. In some examples, the first dataset including at least a first value of a parameter of the first trained machine learning process. Additionally, the operations may include transmitting, to a first edge device of a plurality of edge devices via the communications interface, a message including the first dataset and the second dataset. In some examples, the message may cause the first edge device to apply the first trained machine learning process to sensor data in accordance with the first dataset, apply the second trained machine learning process to the sensor data in accordance with the second dataset, generate first ground truth data based on the application of the first trained machine learning process to the sensor data, generate second ground truth data based on the application of the second trained machine learning process to the sensor data, and perform operations that retrain the first trained machine learning process based in part on the first ground truth data and the second ground truth data. In some instances, the retrained first trained machine learning process may be associated with a second value of the parameter of the first trained machine learning process. Moreover, the message may cause the first edge device to generate a third dataset including the second value of the parameter. Further, the operations may include receiving, from the first edge device, the third dataset, and update a portion of the first dataset with the third dataset. In some examples, the updated portion of the first dataset may include the second value of the parameter.

According another aspect, a method includes obtaining, from a database, a first dataset of a first trained machine learning process associated with a first type of object detection and recognition and a second dataset of a second trained machine learning process associated with a second type of object detection and recognition. In some examples, the first dataset including at least a first value of a parameter of the first trained machine learning process. Additionally, the method may include transmitting, to a first edge device of a plurality of edge devices via the communications interface, a message including the first dataset and the second dataset. In some examples, the message may cause the first edge device to apply the first trained machine learning process to sensor data in accordance with the first dataset, apply the second trained machine learning process to the sensor data in accordance with the second dataset, generate first ground truth data based on the application of the first trained machine learning process to the sensor data, generate second ground truth data based on the application of the second trained machine learning process to the sensor data, and perform operations that retrain the first trained machine learning process based in part on the first ground truth data and the second ground truth data. In some instances, the retrained first trained machine learning process may be associated with a second value of the parameter of the first trained machine learning process. Moreover, the message may cause the first edge device to generate a third dataset including the second value of the parameter. Further, the method may include receiving, from the first edge device, the third dataset, and update a portion of the first dataset with the third dataset. In some examples, the updated portion of the first dataset may include the second value of the parameter.

BRIEF DESCRIPTION OF THE DRAWINGS

Like reference numbers and designations in the various drawings indicate like elements.

DETAILED DESCRIPTION

Figure 1:
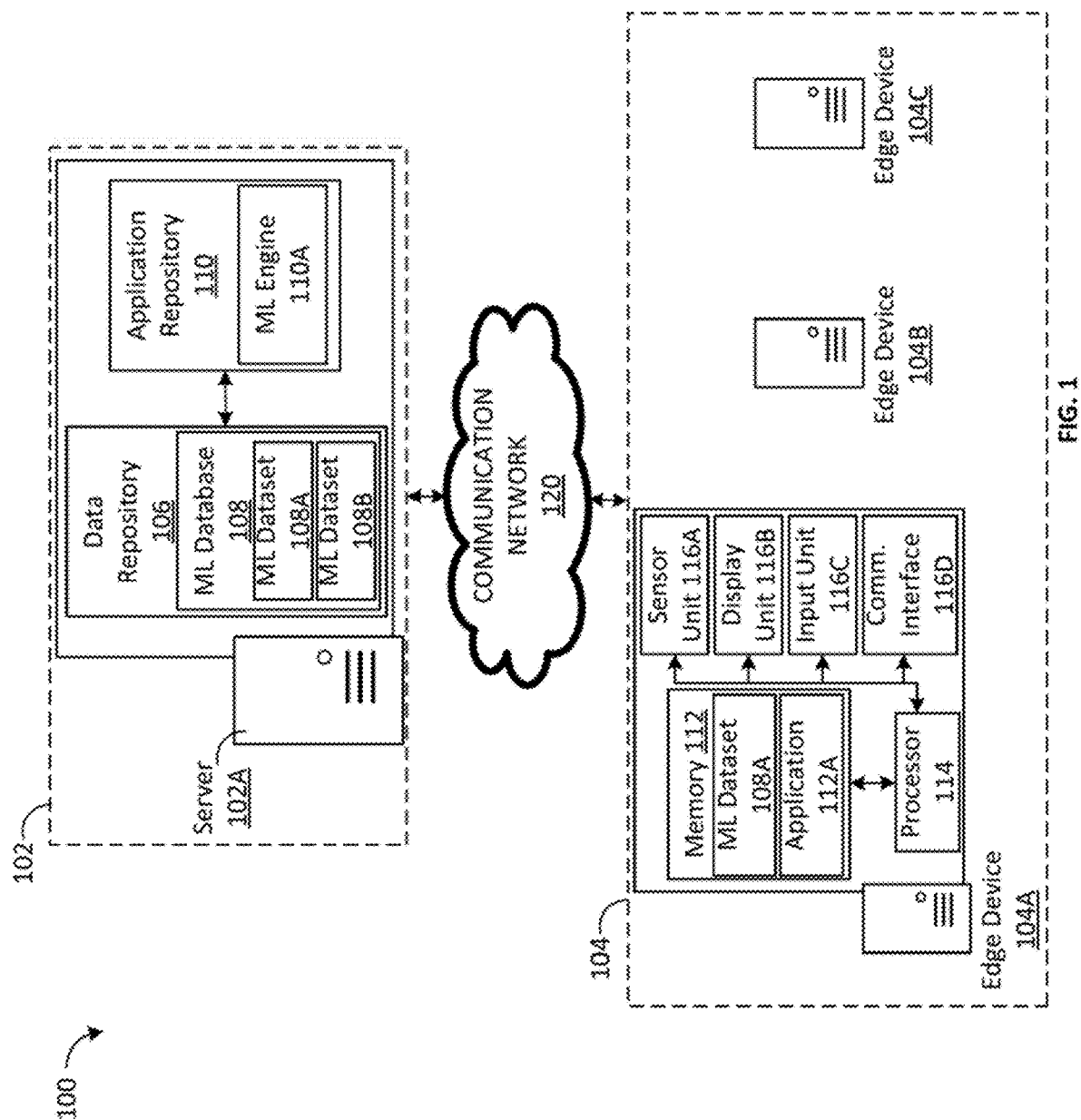
FIG. 1 is a block diagram of an exemplary computing environment, in accordance with some exemplary embodiments.

While the features, methods, devices, and systems described herein may be embodied in various forms, some exemplary and non-limiting embodiments are shown in the drawings, and are described below. Some of the components described in this disclosure are optional, and some implementations may include additional, different, or fewer components from those expressly described in this disclosure.

The embodiments described herein are directed to a federated computing environment that includes a computing system and a number of edge devices. Such embodiments may enable a computing device or system to update or retrain a trained machine learning model/process based on data generated by the edge devices that indicate one or more model parameters of the trained machine learning model/process to update instead of potentially sensitive data generated by the edge devices.

A. Exemplary Computing Environments

FIG. 1 illustrates a block diagram of an example computing environment 100 that includes, among other things, one or more computing systems, such as datacenter computing system 102, and one or more edge devices 104, such as edge device 104A, edge device 104B, and edge device 104C. Each of the one or more computing systems, such as datacenter computing system 102, and one or more edge devices 104 may each be operatively connected to, and interconnected across, one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Datacenter computing system 102 may represent a computing system that includes one or more servers, such as server 102A, and one or more tangible, non-transitory memory devices storing executable code, application engines, or application modules. Each of the one or more servers may include one or more processors, which may be configured to execute portions of the stored code, application engines or modules, or application programs to perform operations consistent with the disclosed exemplary embodiments. For example, as illustrated in FIG. 1, the one or more servers of datacenter computing system 102 may include server 102A having one or more processors configured to execute portions of the stored code, application engines or modules, or application programs maintained within the one or more tangible, non-transitory memories.

In some instances, datacenter computing system 102 may correspond to a discrete computing system, although in other instances, datacenter computing system 102 may correspond to a distributed computing system having multiple, computing components distributed across an appropriate computing network, such as communications network 120 of FIG. 1, or those established and maintained by one or more cloud-based providers, such as Microsoft Azure™, Amazon Web Services™, or another third-party, cloud-services provider. Further, datacenter computing system 102 may also include one or more communications interfaces, such as one or more wireless transceivers, coupled to the one or more processors for accommodating wired or wireless internet communication across communications network 120 with other computing systems and devices operating within computing environment 100 (not illustrated in FIG. 1).

In some examples, datacenter computing system 102 may be associated with a data center, and may be operated by one or more operators of the data center. Additionally, datacenter computing system 102 may maintain one or more trained machine learning processes that each of the edge devices 104 may utilize. Moreover, datacenter computing system 102 may perform any of the exemplary processes described herein to provide or transmit a machine learning (ML) dataset of each of the one or more trained machine learning processes to each of edge devices 104. In some instances, each ML dataset may include one or more model parameters of the corresponding trained machine learning process, and each of the edge devices 104 may utilize the one or more model parameters of each of the one or more trained machine learning processes to deploy the corresponding trained machine learning process. The deployed trained machine learning process may detect one or more objects within an environment the corresponding edge device 104 (e.g., edge device 104A, edge device 104B, edge device 104C) is in. Examples of such trained machine learning processes may include a bounding box machine learning process, a semantic segmentation machine learning process, an instance segmentation machine learning process, and a panoptic segmentation machine learning process.

To facilitate the performance of one or more of these exemplary processes, datacenter computing system 102 may maintain within the one or more tangible, non-transitory memories, data repository 106 that includes, but is not limited to, machine learning (ML) data store 108. As illustrated in FIG. 1, ML data store 108 may store a ML dataset of each of the one or more trained machine learning processes, such as ML dataset 108A of one trained machine learning process and ML dataset 108B of another trained machine learning process, that each edge device 104, such as edge device 104A, edge device 104B and edge device 104C, may deploy. As described herein, the ML datasets of the trained machine learning processes, such as ML dataset 108A of a particular trained machine learning process and ML dataset 108B of another trained machine learning process, may include one or more model parameters, which an edge device 104 may utilize to implement operations utilizing the particular trained machine learning process, such as object recognition of images of sensor data generated by the corresponding edge device 104. Although, FIG. 1 illustrates computing environment 100 includes three edge devices 104, such as edge device 104A, edge device 104B and edge device 104C, the computing environment 100 may include any number of edge devices 104.

Further, and to facilitate the performance of any of the exemplary processes described herein, datacenter computing system 102 may include server 102A that may maintain within the one or more tangible, non-transitory memories, an application repository 110. Application repository 110 may include, among other things, machine learning (ML) engine 110A. ML engine 110A may be executed by the one or more processors of server 102A to obtain, from ML data store 108, a ML dataset of each of the one or more trained machine learning processes, and transmit the ML dataset of each of the one or more trained machine learning processes to one or more edge devices 104. Each of the one or more edge devices 104 may deploy the one or more trained machine learning processes in accordance with the corresponding one or more model parameters of the corresponding ML dataset, such as ML dataset 108A or ML dataset 108B.

In some examples, datacenter computing system 102 may perform operations to update one or more ML datasets of one or more trained machine learning process stored in ML data store 108, based on an update message obtained from each of the one or more of the edge devices 104. In such examples, the update message may include data indicating which model parameters of a particular trained machine learning process to update. Additionally, the data included in the update message may be associated with the particular trained machine learning process that was deployed and retrained by the corresponding edge device 104. For instance, the data included in the update message may indicate to datacenter computing system 102 which values of which model parameter of the ML dataset of the particular trained machine learning process stored in ML data store 108 to update. To facilitate the performance of such operations, executed ML engine 110A may obtain from each of the one or more edge devices 104 the update message. Based on the update message received from each of the one or more client devices, executed ML engine 110A may access ML data store 108 and update the corresponding ML dataset accordingly. Further, executed ML engine 110A may transmit, to each of the one or more client devices, the updated model parameters of the particular trained machine learning process.

Each of the edge devices 104, such as edge device 104A, edge device 104B, and edge device 104C, may include a computing device having one or more tangible, non-transitory memories, such as memory 112, that store data and/or software instructions, and one or more processors, e.g., processor 114, configured to execute the software instructions. The one or more tangible, non-transitory memories may, in some aspects, store application programs, application engines or modules, and other elements of code executable by the one or more processors, such as, but not limited to, an executable web browser (e.g., Google Chrome, Apple Safari, etc.), and additionally or alternatively, an executable application associated with datacenter computing system 102 (e.g., application 112A). In some instances, not illustrated in FIG. 1, memory 112 may also include one or more structured or unstructured data repositories or databases, and each of the edge devices 104 may maintain one or more elements of device data within the one or more structured or unstructured data repositories or databases. For example, the elements of device data may uniquely identify edge device 104 within computing environment 100, and may include, but are not limited to, an Internet Protocol (IP) address assigned to edge device 104 or a media access control (MAC) layer assigned to edge device 104.

Each of the edge devices 104 may include a sensor unit, such as sensor unit 116A, configured to generate sensor data. In some examples, the sensor unit may include one or more sensors. For example, sensor unit 116A may include one or more optical sensors configured to generate sensor data. The sensor data of the one or more optical sensors may include one or more images of an environment the edge device 104 (e.g., edge device 104A) is in. Additionally, each of the one or more images may capture a particular scene at a particular point in time, and each scene may include one or more objects of the environment.

In examples where datacenter computing system 102 transmits ML datasets of one or more trained machine learning processes associated with object recognition to each of the edge devices 104, each of the edge devices 104 may utilize such trained machine learning processes to identify one or more objects in one or more images of sensor data generated by the sensor unit, such as sensor unit 116A. For example, edge device 104A may obtain, from datacenter computing system 102, ML dataset 108A of first trained machine learning process 202 associated with object recognition and detection and ML dataset 108B of second trained machine learning process 204 associated with object recognition and detection. Additionally, edge device 104A may deploy and apply the first trained machine learning process 202 to one or more images, such as a first image, of sensor data generated by sensor unit 116A, in accordance with one or more parameters of corresponding ML dataset 108A. Moreover, edge device 104A may deploy and apply the second trained machine learning process 204 to one or more images, such as the first image, of sensor data generated by sensor unit 116A, in accordance with one or more parameters of corresponding ML dataset 108B. Based on such applications, first trained machine learning process 202 may generate a first ground truth data and second trained machine learning process 204 may generate a second ground truth data. The first ground truth data and the second ground truth data may each identify one or more objects in each of the one or more images of the sensor data.

Moreover, edge device 104 may include a display unit, such as display unit 116B, configured to present interface elements to a corresponding user or customer, such as a user of the edge device 104, and an input unit, such as input unit 116C, configured to receive input from the user (e.g., in response to the interface elements presented through the display unit). By way of example, the display unit may include, but is not limited to, an LCD display unit or other appropriate type of display unit, and input unit 116C may include, but is not limited to, a keypad, keyboard, touchscreen, voice activated control technologies, or appropriate type of input unit. Further, in additional aspects (not illustrated in FIG. 1), the functionalities of the display unit and input unit may be combined into a single device, e.g., a pressure-sensitive touchscreen display unit that presents interface elements and receives input from user 101. Edge device 104 may also include a communications interface, such as communications interface 116D, such as a wireless transceiver device, coupled to a processor of the corresponding edge device, such as processor 114, and configured by the processor to establish and maintain communications with communications network 120 via one or more communication protocols, such as WiFi®, Bluetooth®, NFC, a cellular communications protocol (e.g., LTE®, CDMA®, GSM®, etc.), or any other suitable communications protocol.

Examples of edge device 104 (e.g., edge device 104A, edge device 104B, edge device 104C) may include, but not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on an interface device or unit, such as display unit 116B. In some examples, edge device 104 may be a vehicle. In other examples edge device 104 may be an autonomous vehicle (e.g., a vehicle with autonomous driving capabilities). In some instances, edge device 104 may also establish communications with one or more additional computing systems or devices operating within computing environment 100 across a wired or wireless communications channel (for example, via the communications interface using any appropriate communications protocol).

In some examples, each of the edge devices 104 may perform operations to generate an update message based on ground truth data of the trained machine learning processes that are deployed and utilized by the corresponding edge device 104. For example, datacenter computing system 102 may transmit, to edge device 104B and edge device 104C, message 206 including ML dataset 108A of a first trained machine learning process 202 and a ML dataset 108B of a second trained machine learning process 204. As described herein, the ML dataset of each trained machine learning process stored in ML data store 108, such as ML dataset 108A of first trained machine learning process 202 and ML dataset 108B of second trained machine learning process 204, may include data specifying a value of one or more corresponding model parameters. In some instances, an edge device 104, such as edge device 104A, edge device 104B and edge device 104C, may utilize ML dataset 108A of the particular trained machine learning process to deploy and implement operations utilizing the particular trained machine learning process, such as object detection and recognition of images of sensor data generated by the corresponding edge device 104.

Additionally, each of edge device 104B and edge device 104C, may deploy first trained machine learning process 202 and second trained machine learning process 204 based on the received corresponding ML dataset 108A and ML dataset 108B. Moreover, while each of edge device 104B and edge device 104C is in operation, a corresponding sensor unit may generate sensor data that includes at least a first image of an environment edge device 104B and edge device 104C may be in. In some instances, each of the edge device 104B and edge device 104C may apply the first trained machine learning process 202 and the second trained machine learning process 204 to the first image. The application of the first trained machine learning process 202 and the second trained machine learning process 204 to the first image may cause each of the edge device 104B and edge device 104C to generate ground truth data associated with the first trained machine learning process 202 and ground truth data associated with the second trained machine learning process 204. For instance, edge device 104B may generate a first ground truth data associated with the first trained machine learning process 202 and a second ground truth data associated with the second trained machine learning process 204. Additionally, each of the first ground truth data and second ground truth data may each identify one or more objects within the first image of the environment edge device 104B may be in. In another instance, edge device 104C may generate a third ground truth data associated with the first trained machine learning process 202 and a fourth ground truth data associated with the second trained machine learning process 204. Additionally, each of the third ground truth data and fourth ground truth data may each identify one or more objects within the first image of the environment edge device 104C may be in.

Based on the ground truth data of the first trained machine learning process 202 and the second trained machine learning process 204, each of the edge device 104B and edge device 104C may determine whether, for each image of the sensor data, there are any discrepancies between the ground truth data associated with the corresponding first trained machine learning process 202 and second trained machine learning process 204. For instance, following the example above, edge device 104B may perform operations that compare, for a first image, the first ground truth data and second ground truth data to determine whether any discrepancies exist. For example, edge device 104B may determine a discrepancy exists if in a particular region of interest of the first image, the second ground truth data identifies an object, such as a traffic sign, while the first ground truth data does not identify any object. In another example, edge device 104B may determine a discrepancy exists if in a particular region of interest of the first image, the first ground truth data identifies an object, while the second ground truth data does not identify any object.

In another instance, following the example above, edge device 104C may perform operations that compare, for a first image, the third ground truth data and fourth ground truth data to determine whether any discrepancies exist. For example, edge device 104C may determine a discrepancy exists if in a particular region of interest of the first image, the fourth ground truth data identifies an object, such as a stop light, while the third ground truth data does not identify any object. In another example, edge device 104C may determine a discrepancy exists if in a particular region of interest of the first image, the third ground truth data identifies an object, while the fourth ground truth data does not identify any object.

Additionally, for each image each of the edge devices 104, such as edge device 104B and edge device 104C, determines a discrepancy exists between the associated ground truth data of each of the first trained machine learning process 202 and second trained machine learning process 204, the corresponding edge device 104 may generate a corresponding notification. The notification may enable a user of the corresponding edge device 104 to provide annotations for the corresponding discrepancy. For example, each of the edge devices 104, such as edge device 104B and edge device 104C, may determine, for the first image, a discrepancy exists in a particular region of interest. For instance, following the example above with edge device 104B, the second ground truth data may identify an object in a particular region of interest of the first image, whereas in the first ground truth data indicates no object is identified in the particular region of interest of the first image. In such an instance, edge device 104B may generate a notification message that includes a portion of the particular region of interest of the first image. Additionally, edge device 104B may display or present, on the display unit the particular region of interest of the first image. In some examples, edge device 104B may also prompt the user to provide inputs into the input unit. Such inputs may indicate a confirmation of the discrepancy between the first ground truth and the second ground truth as it relates to the particular region of interest of the first image. For example, the interface elements may prompt the user to indicate whether an object exists in the displayed particular region of interest. Additionally, in some examples, the interface elements may also prompt the user to indicate what the object might be, if the input of the user indicates that an object exists in the particular region of interest. In various examples, the interface elements may also enable the user to highlight or construct a boarder around the object. The corresponding edge device 104, such as edge device 104B, may generate response data that includes the various inputs of the user as it pertains to an image presented on the display unit, such as the particular region of interest of the first image.

Moreover, for each image each of the edge devices 104, such as edge device 104B and edge device 104C, determines a discrepancy exists between the associated ground truth data of each of the first trained machine learning process 202 and second trained machine learning process 204, the corresponding edge device 104 may generate corresponding discrepancy data. The discrepancy data may include, for the corresponding image, one or more portions of the corresponding image, such as the particular region of interest in the first image. In some examples, the discrepancy data may further include response data associated with the corresponding image, such as the response data of the first image indicating whether an object exists in the first image.

Each of the edge devices 104 may generate the update message based on the discrepancy data generated by the corresponding edge device 104. For example, following the example above, edge device 104B may determine a discrepancy exists between the first ground truth data and second ground truth data because for a particular region of interest of the first image. For instance, edge device 104B may determine the second ground truth data identifies an object, such as a stop sign, while the first ground truth data does not identify any object. Additionally, based on the determined discrepancy, one or more portions of the first image, and an associated response data, edge device 104B may generate discrepancy data that indicates the determined discrepancy, along with a confirmation of the existence of the object in the particular region of interest, and/or that the object is a stop sign. Based on the discrepancy data and the model parameters of the first trained machine learning process 202, edge device 104B may perform operations that retrain the first trained machine learning process 202 deployed on edge device 104B. Additionally, edge device 104B may generate the update message that includes one or more model parameters of the retrained first trained machine learning process 202.

B. Computer-Implemented Techniques for Updating a Machine Learning Process

Figure 2:
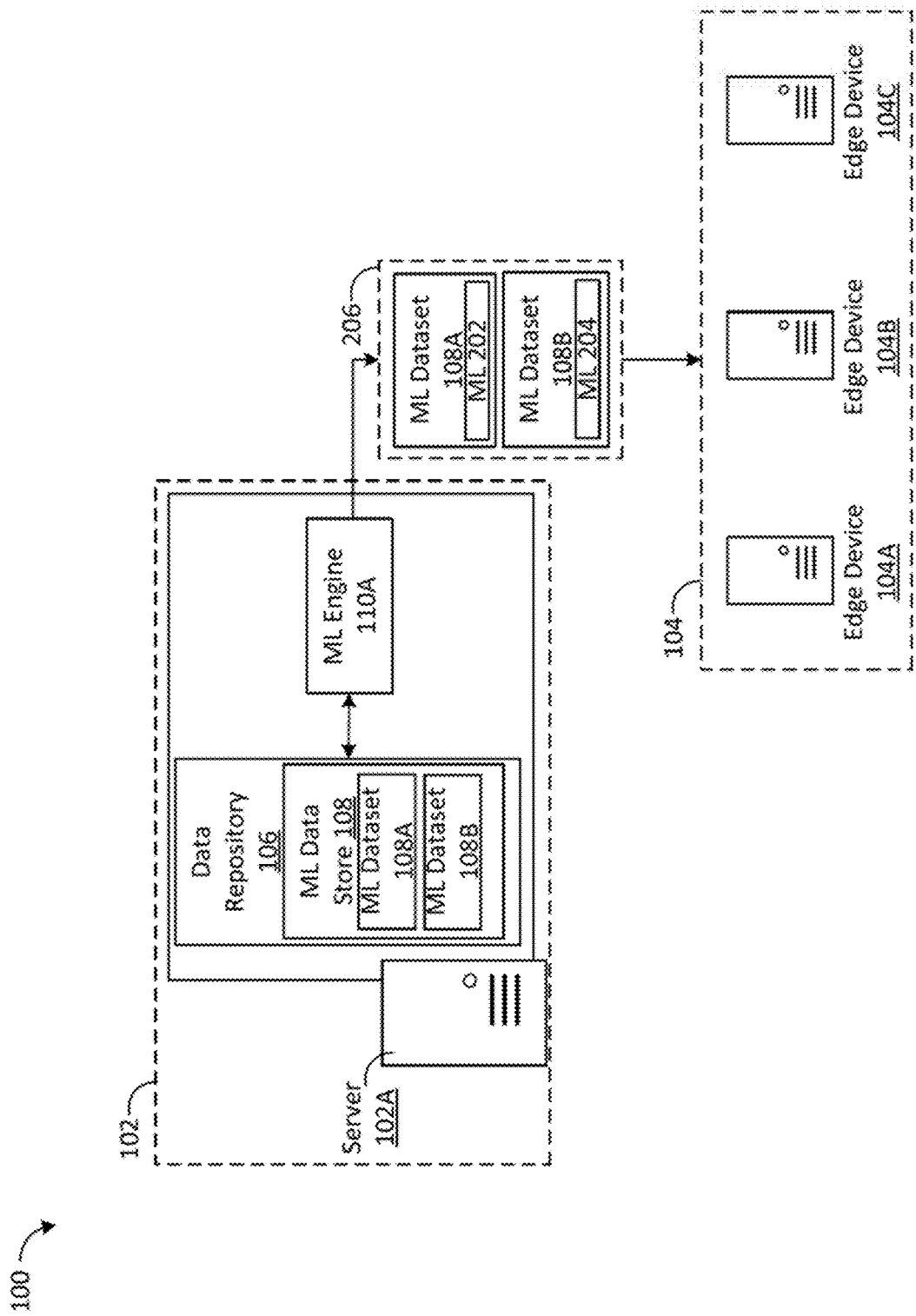
FIGS. 2-6 are block diagrams illustrating a portion of an exemplary computing environment, in accordance with some exemplary embodiments.

As described herein, each of the edge devices 104, such as edge device 104A, edge device 104B and edge device 104C may be a vehicle. Additionally, datacenter computing system 102, such as server 102A, may update a trained machine learning process based on update message 370 generated by each of the edge devices 104. Referring to FIG. 2, and upon execution by one or more processors of server 102A of datacenter computing system 102, executed ML engine 110A may perform operations that access data repository 106 (e.g., as maintained within the one or more tangible, non-transitory memories of datacenter computing system 102), and obtain a machine learning (ML) dataset of each of the one or more trained machine learning processes, such as ML dataset 108A of a first trained machine learning process 202 and ML dataset 108B of a second trained machine learning process 204. Additionally, executed ML engine 110A may generate message 206 and packaged one or more portions of ML dataset of each of the one or more machine learning processes into a portion of message 206. Moreover, executed ML engine 110A may transmit message 206 to each of the edge devices 104.

For example, as illustrated in FIG. 2 executed ML engine 110A may perform operations that access data repository 106 and obtain ML dataset 108A of a first trained machine learning process 202 and ML dataset 108B of a second trained machine learning process 204. Additionally, executed ML engine 110A may generate message 206 and packaged one or more portions of ML dataset 108A and one or more portions of ML dataset 108B a portion of message 206. Moreover, executed ML engine 110A may transmit message 206 to edge device 104A, edge device 104B and edge device 104C. Although, FIG. 2 illustrates computing environment 100 includes three edge devices 104, such as edge device 104A, edge device 104B and edge device 104C, a datacenter computing system 102, such as server 102A, may transmit message 206 to any number of edge devices 104.

As described herein, ML dataset of a particular trained machine learning process, such as ML dataset 108A of first trained machine learning process 202 and ML dataset 108B of second trained machine learning process 204, may include data specifying a value of one or more model parameters associated with the corresponding trained machine learning process. In some instances, an edge device 104, such edge device 104A, edge device 104B and edge device 104C, may utilize the ML dataset of the particular trained machine learning process to deploy apply the particular machine learning process to sensor data generated by the corresponding edge device 104. Additionally, as described herein, examples of such trained machine learning process may be associated with object detection and recognition. For instance, the trained machine learning process may include a bounding box machine learning process, a semantic segmentation machine learning process, an instance segmentation machine learning process, and a panoptic segmentation machine learning process.

Figure 3:
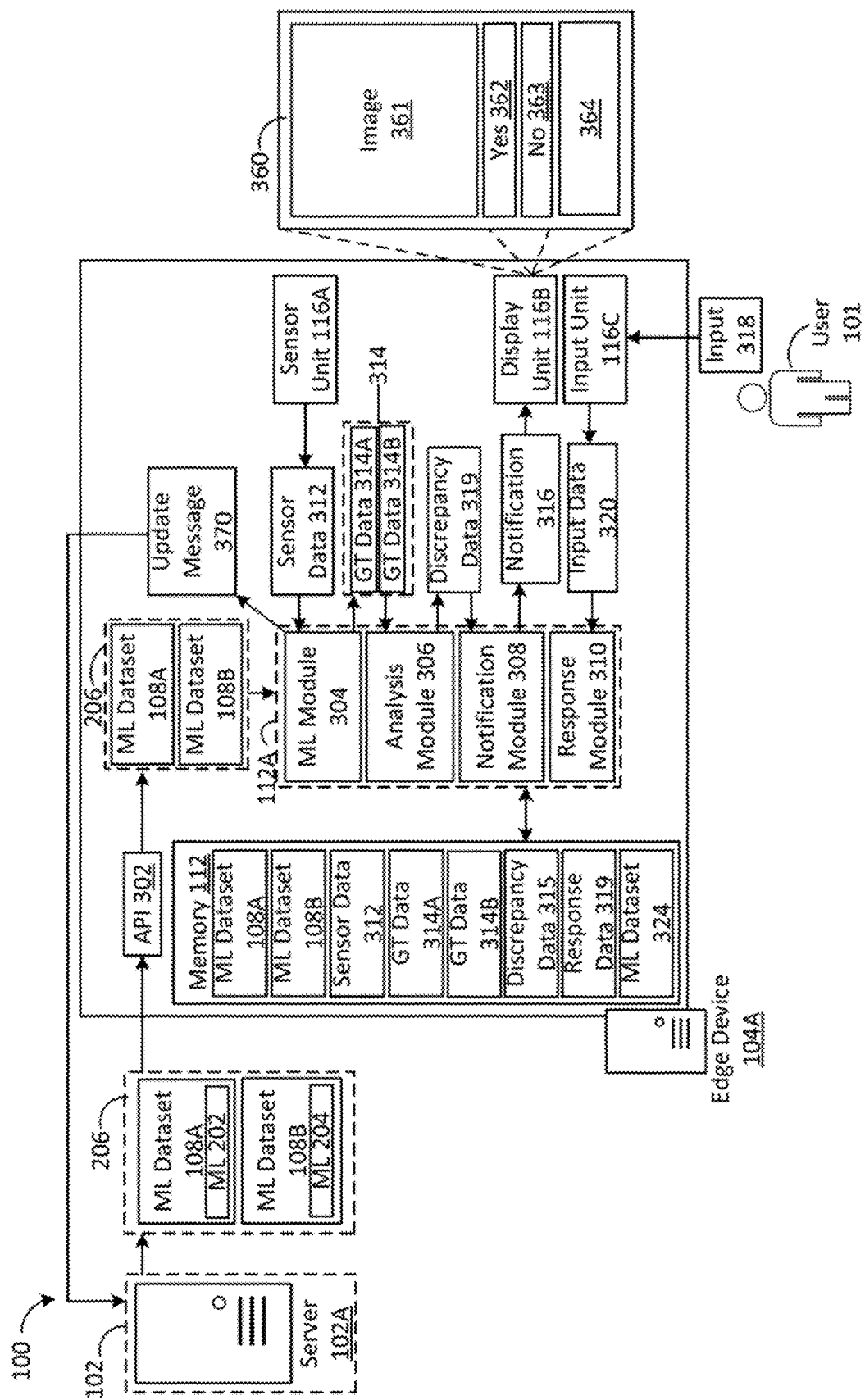

By way of example, each of edge devices 104, such as edge device 104A, may generate the update message utilized by datacenter computing system 102 to update an ML dataset of a trained machine learning process stored in ML data store 108. FIG. 3, illustrates an example edge device 104A that generates the update message. Although FIG. 3 may only illustrate edge device 104A, any number of edge devices 104 may perform the operations as described herein to generate update message 370. Referring to FIG. 3, a programmatic interface established and maintained by edge device 104A, such as application programming interface (API) 302 of edge device 104A, may receive a message 206 that includes ML dataset 108A of a first trained machine learning process 202 and ML dataset 108B of a second trained machine learning process 204. As described herein, each of the edge devices 104 may receive message 206 across communications network 120 via a channel of communications established programmatically between API 302 and executed ML engine 110A of datacenter computing system 102.

In various examples, one or more application programs, such as one or more applications 112A, executed by processor 114 of edge device 104A, such as ML module 304, analysis module 306, notification module 308 and response module 310 of edge device 104A, may perform any of the exemplary processes described herein, to generate update message 370 indicating which model parameters of a particular machine learning process to update. Executed ML engine 110A of datacenter computing system 102 may utilize update message 370 obtained from edge device 104A (or any number of edge devices 104), to update a corresponding ML dataset of the particular machine learning process, such as ML dataset 108A of first trained machine learning process 202. Additionally, ML engine 110A may transmit to each of the one or more edge devices 104 a ML dataset that incorporates the data of the update message 370. The ML dataset that incorporate the data of update message 370 may include an update or change to a value of one or more model parameters of first trained machine learning process 202.

By way of example, upon execution by processor 114 of edge device 104A, executed ML module 304 may perform operations that store a first ML dataset 108A of a first trained machine learning process 202 and a second ML dataset 108A of a second trained machine learning process 204, within memory 112. In such an example, first trained machine learning process 202 and second trained machine learning process 204 may each have object recognition capabilities. Additionally, executed ML module 304 may perform operations that access memory 112 to configure the first trained machine learning process 202 based on the first ML dataset 108A and configure the second trained machine learning process 204 based on the second ML dataset 108A. Once executed ML module 304 has configured the first trained machine learning process 202 and second trained machine learning process 204, executed ML module 304 may utilize sensor data 312 as inputs to each of the first trained machine learning process 202 and second trained machine learning process 204 to generate ground truth data, such as ground truth data 314A and ground truth data 314B respectively. As described herein, the ground truth data may identify one or more objects within one or more images included in sensor data 312 generated by sensor unit 116A. In some instances, executed ML module 304 may store the generated ground truth, such as ground truth data 314A and ground truth data 314B, as well as sensor data 312 into memory 112.

Figure 4:
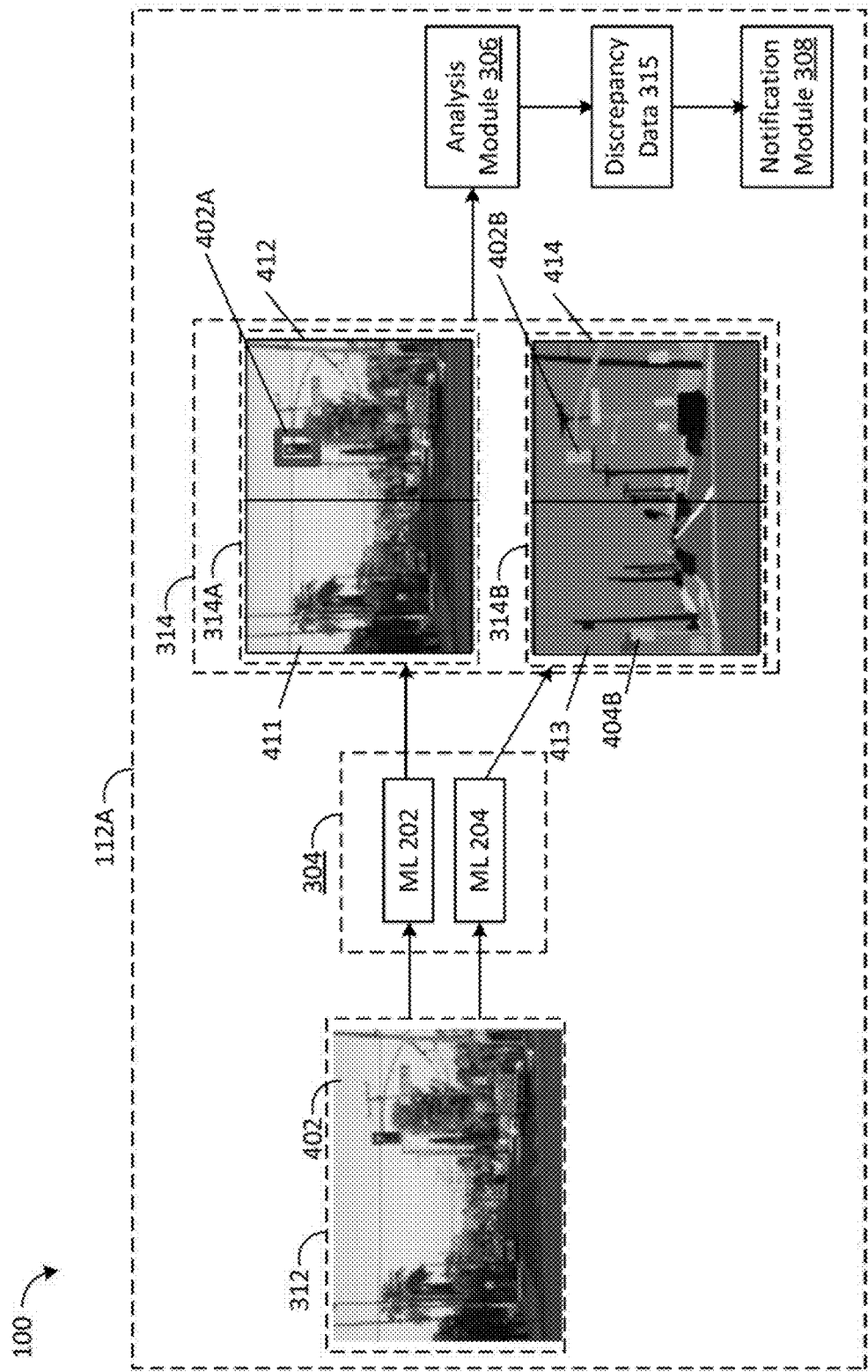

FIG. 4 illustrates a block diagram of an exemplary process for determining an object detection or recognition discrepancy between ground truths of multiple machine learning processes. Additionally, FIG. 4 illustrates sensor data 312 may include one or more images, including first image 402. Additionally, executed ML module 304 may access memory 112 to obtain at least first image 402 of sensor data 312 and provide first image 402 of sensor data 312 as inputs to first trained machine learning process 202 and second trained machine learning process 204. In accordance with the ML dataset 108A of the first trained machine learning process 202, first trained machine learning process 202 may generate a first ground truth data 314A of first image 402 that identifies one or more objects, such as object 402A. Additionally, in accordance with the ML dataset 108A of the second trained machine learning process 204, second trained machine learning process 204 may generate second ground truth data 314B of first image 402 that identifies one or more objects, such as objects 402B and 404B.

In some instances, edge device 104 may be a vehicle or an autonomous vehicle, sensor unit 116A may be an optical sensor configured to generate sensor data 312. Sensor data 312 generated by the optical sensor may include one or more images of a particular scene at a particular point in time of an environment the edge device 104 is in. Further, each of the one or more images may include one or more objects. Executed ML module 304 may obtain such sensor data 312 and utilize sensor data 312 as inputs to the first trained machine learning process 202 and second trained machine learning process 204. The first trained machine learning process 202 may generate one or more elements of ground truth data 314A and the second trained machine learning process 204 may generate one or more elements of ground truth data 314B. In some instances, each of the ground truth data 314A and ground truth data 314B may identify one or more objects within one or more images included in sensor data 312.

Additionally, upon execution by processor 114 of edge device 104A, executed analysis module 306 may perform operations that determine whether an object detection or recognition discrepancy exists for any of the one or more images included in sensor data 312 between the first trained machine learning process 202 and the second trained machine learning process 204. For example, executed analysis module 306 may identify one or more portions of ground truth data 314A associated with a first image of sensor data 312 and one or more portions of ground truth data 314B associated with the first image. The one or more portions of ground truth data 314A and one or more portions of ground truth data 314B may identify one or more regions of interest within the first image and one or more identified objects within each of the one or more regions of interest. Additionally, based on the identified one or more portions of ground truth data 314A and identified one or more portions of ground truth data 314B, executed analysis module 306 may determine which regions of interest of the ground truth data 314A match regions of interest of the ground truth data 314B.

Further, executed analysis module 306 may determine whether there are any object detection and recognition discrepancies between each matching regions. For instance, executed analysis module 306 may determine, for a particular region of interest in the first image, an object recognition discrepancy exists, if executed analysis module 306 determines portions of ground truth data 314B identifies, for the particular region of interest, an object, such as a traffic sign, while portions of ground truth data 314A identifies, for the same particular region of interest, no object. Based on each determined discrepancy of one or more images, such as the first image, executed analysis module 306 may generate discrepancy data 315 that identifies and characterizes each determined discrepancy. In some examples, discrepancy data 315 may include one or more portions of each image associated with each determined discrepancy. Additionally, discrepancy data 315 may include data that identifies or indicates where on each corresponding image the object recognition discrepancy between ground truth data 314A and ground truth data 314B is located or determined to exist. In some examples, executed analysis module 306 may store the discrepancy data 315 of each determined discrepancy within memory 112.

By way of example, referring back to FIG. 4, executed ML module 304 may provide ground truth data 314A of first image 402 and ground truth data 314B of first image 402 as inputs to executed analysis module 306. Executed analysis module 306 may perform operations that compare various regions of interest of ground truth data 314A of first image 402 to similar regions of interest of ground truth data 314A of first image 402. For example, as illustrated in FIG. 4, executed analysis module 306 may compare region 411 of ground truth data 314A with region 413 of ground truth data 314B, and compare region 412 of ground truth data 314B with region 414 of ground truth data 314B. Additionally, executed analysis module 306 may determine, for each region that is compared with one another, such as a compared of region 411 and region 413 and a compared region of region 412 and region 414, executed analysis module 306 may whether any object detection or recognition discrepancies exist between each compared regions of ground truth data 314A of first image 402 and ground truth data 314B. For example, executed analysis module 306 may analyze region 412 and region 414 to determine whether objects detected in region 412 are also being detected in the same or similar location in region 414 and/or whether object detected in region 414 are also being detected in the same or similar location in region 412. As illustrated in FIG. 4, an object 402A is detected in a particular location or area of region 412, and similarly object 402B is also detected in in the same or similar location or area in region 414. Additionally, executed analysis module 306 may analyze region 411 and region 413 to determine whether objects detected in region 411 are also being detected in the same or similar location in region 413 and/or whether object detected in region 413 are also being detected in the same or similar location in region 411. As illustrated in FIG. 4, an object 404B is detected in a first location of region 413, while no object is detected in the same or similar location in region 411. As such, executed analysis module 306 may determine a discrepancy exists with ground truth data 314A of first image 402 and ground truth data 314B of first image 402—specifically between region 411 and region 413. Further, executed analysis module 306 may generate discrepancy data 315 that identifies and characterizes determined discrepancy of ground truth data 314A of first image 402 and ground truth data 314B of first image 402 (e.g., the determine discrepancy between region 411 and region 413).

In various examples, a user, such as user 101 of edge device 104, may provide annotations or input to each determined discrepancy identified in discrepancy data 315. For example, upon execution by processor 114 of edge device 104A, executed notification module 308 may perform operations that generate notification message 316 associated with each discrepancy identified in discrepancy data 315. In some examples, notification message 316 may include, among other things, one or more portions of discrepancy data 315, such as one or more portions of one or more images of sensor data 312 associated with each determined discrepancy. In some instances, notification message 316 may include data that identifies or indicates where on each corresponding image the object recognition discrepancy between ground truth data 314A and ground truth data 314B is located or determined to exist. In some instances, not illustrated in FIG. 3, executed notification module 308 may also perform operations that package, into an additional portion of notification message 316, elements of layout data that specifies a disposition of, or a visual characteristic of, one or more interface elements that establish a graphical representation of notification message 316 associated with each determined discrepancy (e.g., when presented on a digital interface by an application program executed by edge device 104, such as application 112A described herein).

In various examples, executed notification module 308 may provide notification message 316 as an input to an interface element generation module 317 of executed application 112A, and executed interface element generation module 317 may perform operations that generate and route interface elements 350 to display unit 116B. In some instances, when rendered for presentation within a corresponding notification interface 360 by display unit 116B, interface elements 350 provide a graphical representation of notification message 316 to the user, such as user 101, within a single display screen or window, or across multiple display screens or windows, of notification interface 360 (e.g., in accordance with the one or more elements of layout data, as described herein). In some examples, the graphical representation of notification message 316 may include one or more portions of image 361 associated with the determined discrepancy associated with notification message 316. In other examples, when presented within notification interface 360, the graphical representation of notification message 316 may prompt the user to provide annotations or additional data characterizing the object recognition discrepancy associated with the notification message 316. As illustrated in FIG. 3, when presented within notification interface 360, the graphical representation of notification message 316 may prompt the user to provide annotations or additional data characterizing image 361 associated with the object recognition discrepancy of notification message 316. For instance, in FIG. 3, graphical representation of notification message 316 may prompt the user to confirm whether image 361 includes an object, such as a stop sign, based on additional input provided to input unit 116C of edge device 104 that selects a respective one of an "YES" icon 362, and a "NO" icon 363 presented within notification interface 360. Additionally, as illustrated in FIG. 3, notification interface 360 may enable the user to provide input 318 of what the object may be, such as, the stop sign. For instance, notification interface 360 may include text box input field or multi-choice selection 364 that may enable the user 101 to provide input 318 that indicates what the object might be in image 361.

In examples where the edge device 104, such as edge device 104A, may be a vehicle or an autonomous vehicle, display unit 116B may be a center console unit with a display. Additionally, the input unit 116C may be part of the center console unit with the display. In such examples, notification interface 360, along with the graphical representation of notification message 316 may be displayed on the center console display unit of the vehicle or autonomous vehicle. In some examples, the presentation of the graphical representation of notification message 316 may be in response to an event, such as the vehicle being parked, fueled and/or charged.

For example, one or more other sensors of sensor unit 116A associated with the vehicle or autonomous vehicle may detect that the vehicle or autonomous vehicle has parked (e.g., a charging event such as, the engine being turned off, the vehicle is put into park mode, etc.). Additionally, the one or more other sensors may generate and transmit to executed notification module 308, event data indicating the parking event. Executed notification module 308 may generate and transmit the notification message 316 to interface element generation module 317 in response to obtaining the event data. Alternatively, in some examples, the one or more other sensors may generate and transmit to executed interface element generation module 317, event data indicating the parking event. Executed interface element generation module 317 may generate and route interface elements 350 to display unit 116B in response to obtaining the event data.

In another example, one or more fuel sensors of sensor unit 116A associated with the vehicle or autonomous vehicle may detect that fuel is flowing in the fuel tank of the vehicle or autonomous vehicle (e.g., a fueling event). Additionally, the one or more fuel sensors may generate and transmit to executed notification module 308, event data indicating the fueling event. Executed notification module 308 may generate and transmit the notification message 316 to interface element generation module 317 in response to obtaining the event data. Alternatively, in some examples, the one or more other sensors may generate and transmit to executed interface element generation module 317, event data indicating the parking event. Executed interface element generation module 317 may generate and route interface elements 350 to display unit 116B in response to obtaining the event data.

In yet another example, one or more charge sensors of sensor unit 116A associated with the vehicle or autonomous vehicle may detect that the battery of the vehicle or autonomous vehicle is charging and/or or that the vehicle or autonomous vehicle is electrically coupled to a charging unit/station (e.g., a charging event). Additionally, the one or more charge sensors may generate and transmit to executed notification module 308, event data indicating the charge event. Executed notification module 308 may generate and transmit the notification message 316 to interface element generation module 317 in response to obtaining the event data. Alternatively, in some examples, the one or more other sensors may generate and transmit to executed interface element generation module 317, event data indicating the parking event. Executed interface element generation module 317 may generate and route interface elements 350 to display unit 116B in response to obtaining the event data.

Referring back to FIG. 3, edge device 104 may receive input data 320 responsive to the interface elements and indicative of the annotations or additional data the user, such as user 101, provided with respect to the presented object recognition discrepancy (e.g., image 361). Additionally, edge device 104 may package all, or a selected portion, of the input data 320 into corresponding portions of response data 319. In some instances, executed response module 310 may store response data 319 into memory 112. Moreover, edge device 104 may package one or more portions of response data 319 into portions of discrepancy data 315 associated with the input data 320. In some examples, the one or more portions of the discrepancy data 315 associated with the input data 320 may include data identifying and characterizing the determined associated discrepancy and one or more portions of an image, such as the first image, that is associated with the determined associated discrepancy.

In some instances, input data 320 of the user, such as user 101 may indicate that the user had confirmed image 361 associated with the determined object recognition discrepancy of a particular region of interest of an image, such as a first image of sensor data 312, includes an object. For instance, the graphical representation of notification message 316 may include image 361 of an object, such as a stop sign that was identified in ground truth data 314B but not in ground truth data 314A, along with a prompt requesting confirmation of whether image 361 includes an object (e.g., "is there an object in the displayed image?"). Additionally, user data 320 may indicate that the user selected "YES" icon 362, and in some examples, user data 320 may further include data identifying what the object might be in image 361 based on the input 318 of the user provided in text box input field or multi-choice selection 364 (e.g., a stop sign). Moreover, input unit 116C may route input data 320 to response module 310 of executed application 112A. In some instances, executed response module 310 may perform operations that generate response data 319 including one or more portions of input data 320. Additionally, executed response module 310 may access memory 112 to obtain discrepancy data 315 associated with input data 320 and package one or more portions of response data 319 into portions of the discrepancy data 315. As described herein, the or more portions of the discrepancy data 315 associated with the input data 320 may include data identifying and characterizing the determined associated discrepancy and one or more portions of an image, such as the first image, that is associated with the determined associated discrepancy.

In other instances, input data 320 of the user, such as user 101, may indicate that the user had confirmed image 361 associated with the determined object recognition discrepancy of a particular region of interest of an image, such as a first image of sensor data 312, does not include an object. For instance, the graphical representation of notification message 316 may include image 361 of an environment around edge device 104, along with a prompt requesting confirmation of whether image 361 includes an object (e.g., "is there an object in the displayed image?"). In such an instance, ground truth data 314A may indicate that an object is identified in image 361, however ground truth data 314B may indicate that no object was identified in image 361. Additionally, user data 320 may indicate that the user selected "NO" icon 363. Moreover, input unit 116C may route input data 320 to response module 310 of executed application 112A. In some instances, executed response module 310 may perform operations that generate response data 319 including one or more portions of input data 320. Additionally, executed response module 310 may access memory 112 to obtain discrepancy data 315 associated with input data 320 and package one or more portions of response data 319 into portions of the discrepancy data 315. As described herein, the or more portions of the discrepancy data 315 associated with the input data 320 may include data identifying and characterizing the determined associated discrepancy and one or more portions of an image, such as the first image, that is associated with the determined associated discrepancy.

Further, upon execution by processor 114 of edge device 104A, executed ML module 304 may perform operations that retrain the first trained machine learning process 202 based on discrepancy data 315. By way of example, executed ML module 304 may perform operations that access memory 112 to obtain ML dataset 108A of the first trained machine learning process 202 and discrepancy data 315. Additionally, executed ML module 304 may perform operations that retrain the first trained machine learning process 202 based on ML dataset 108A and discrepancy data 315. Further, a value of one or more model parameters specified in ML dataset 108A of the first trained machine learning process 202 may be changed or adjusted because executed ML module 304 has retrained or is retraining the first trained machine learning process 202 based on the ML dataset 108A and discrepancy data 315. In some instances, executed ML module 304 may generate another or an additional ML dataset 324 of the retrained first trained machine learning process 202. The additional ML dataset 324 may include data specifying a value of one or more model parameters associated with the retrained first trained machine learning process 202. For instance, ML dataset 108A of the first trained machine learning process 202 may include data specifying at least a first value of a first model parameter, while the ML dataset 324 of the retrained first trained machine learning process 202 may include data specifying at least a second value of the first model parameter. The second value of the first model parameter may be different and the first value of the first model parameter. In other instances, executed ML module 304 may store ML dataset 324 within memory 112.

Upon retraining the first trained machine learning process, executed ML module 304 may perform operations that generate and transmit an update message 370 including data specifying values of one or more parameters of the retrained first trained machine learning process across communications network 120 via a channel of communications established programmatically between API 501 and executed ML module 304 of edge device 104A and/or any other number of edge devices 104, such as edge device 104B and 104C. For example, after executed ML module 304 of edge device 104A retrains the first trained machine learning process 202, executed ML module 304 may access memory 112 to obtain ML dataset 324, generate an update message 370 and may package one or more portions of ML dataset 324 into portions of update message 370. Additionally, executed ML module 304 may transmit update message 370 across communications network 120 via a channel of communications established programmatically to API 501.

Figure 5:
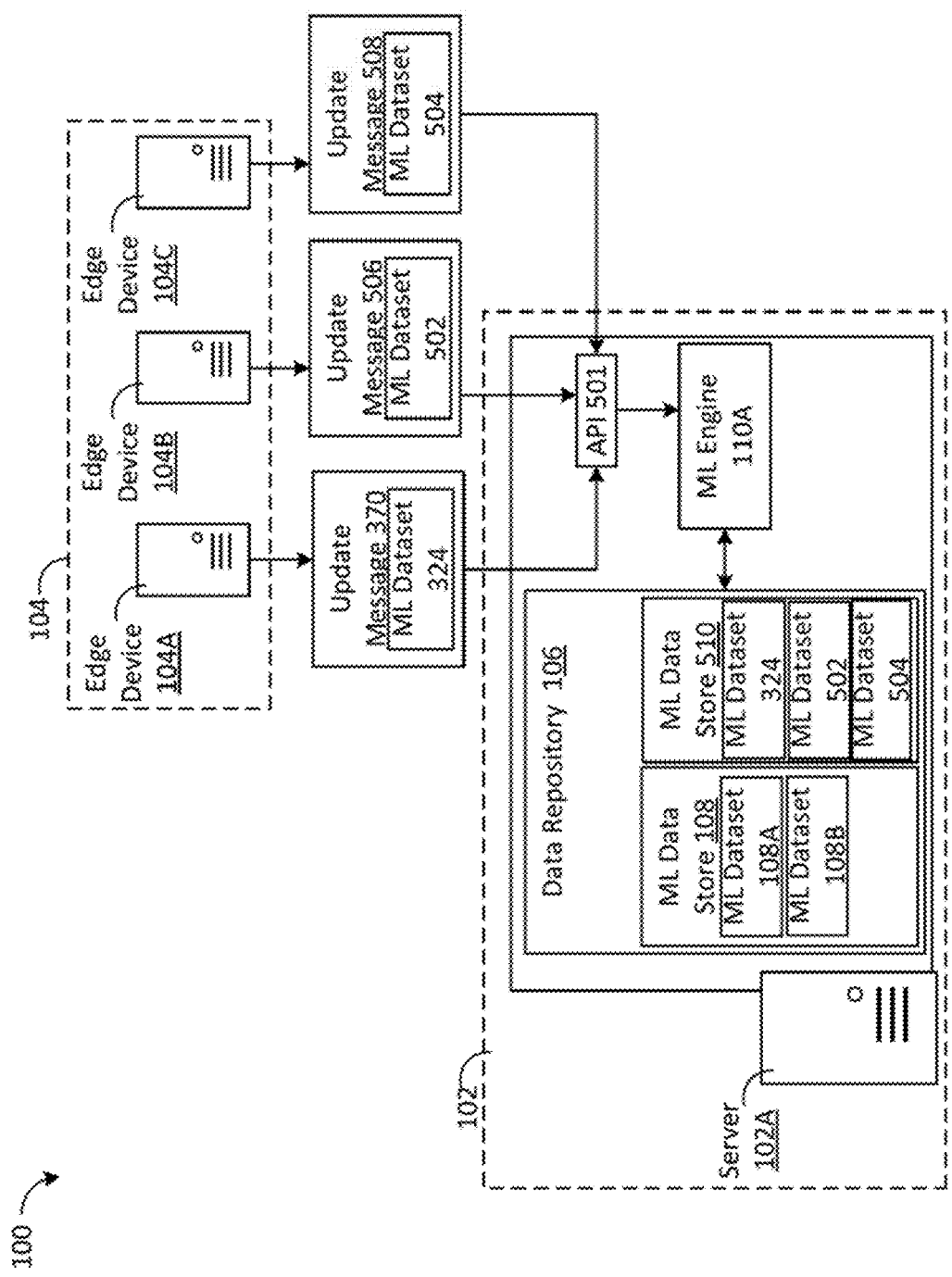

Datacenter computing system 102 may receive one or more update messages include ML datasets of retrained machine learning processes, such as update message 370 including ML dataset 324 of the retrained first trained machine learning process 202, from one or more edge devices 104, such as edge device 104A, edge device 104B, and edge device 104C. As illustrated in FIG. 5, each of the edge devices 104 may retrain a machine learning process, such as first trained machine learning process 202, and transmit to server 102A a corresponding update message including ML dataset of the retrained machine learning process, such as ML dataset 324, ML dataset 502 and ML dataset 504. Additionally, each of the edge devices 104 may package one or more portions of a ML dataset of a machine learning process the corresponding edge device 104 retrained into portions of a corresponding update message, such as update message 370, update message 506, and update message 508. As illustrated in FIG. 5, update message 506 may include one or more portions of ML dataset 502, and update message 508 may include one or more portions of ML dataset 504. Referring to FIG. 5, API 501 of server 102A of datacenter computing system 102 may receive update message 370 from edge device 104A, update message 506 from edge device 104B and update message 508 from edge device 104C. Although FIG. 5 may only illustrate three edge devices 104, a datacenter computing system 102, such as server 102A, may receive, from any number of edge devices 104, ML datasets of trained machine learning processes that were retrained on the corresponding edge device 104.

API 501 of server 102A may route the update messages received from each of the edge devices 104, such as update message 370 from edge device 104A, update message 506 from edge device 104B and update message 508 from edge device 104C, to executed ML engine 110A. Executed ML engine 110A may implement operations that parse each of the received update messages to obtain the one or more portions of the corresponding ML dataset and store the one or more portions of the corresponding ML dataset within a corresponding portion of data repository 106, such as retrained ML data store 510. For example, executed ML engine 110A may parse update message 370, update message 506 and update message 508. Additionally, ML engine 110A may obtain from the parsed update message 370, update message 506 and update message 508, one or more portions of ML dataset 324, one or more portions of ML dataset 502 and one or more portions of ML dataset 504 respectively. Further, executed ML engine 110A may store one or more portions of ML dataset 324, one or more portions of ML dataset 502 and one or more portions of ML dataset 504 within a corresponding portion of data repository 106, such as retrained ML data store 510.

Figure 6:
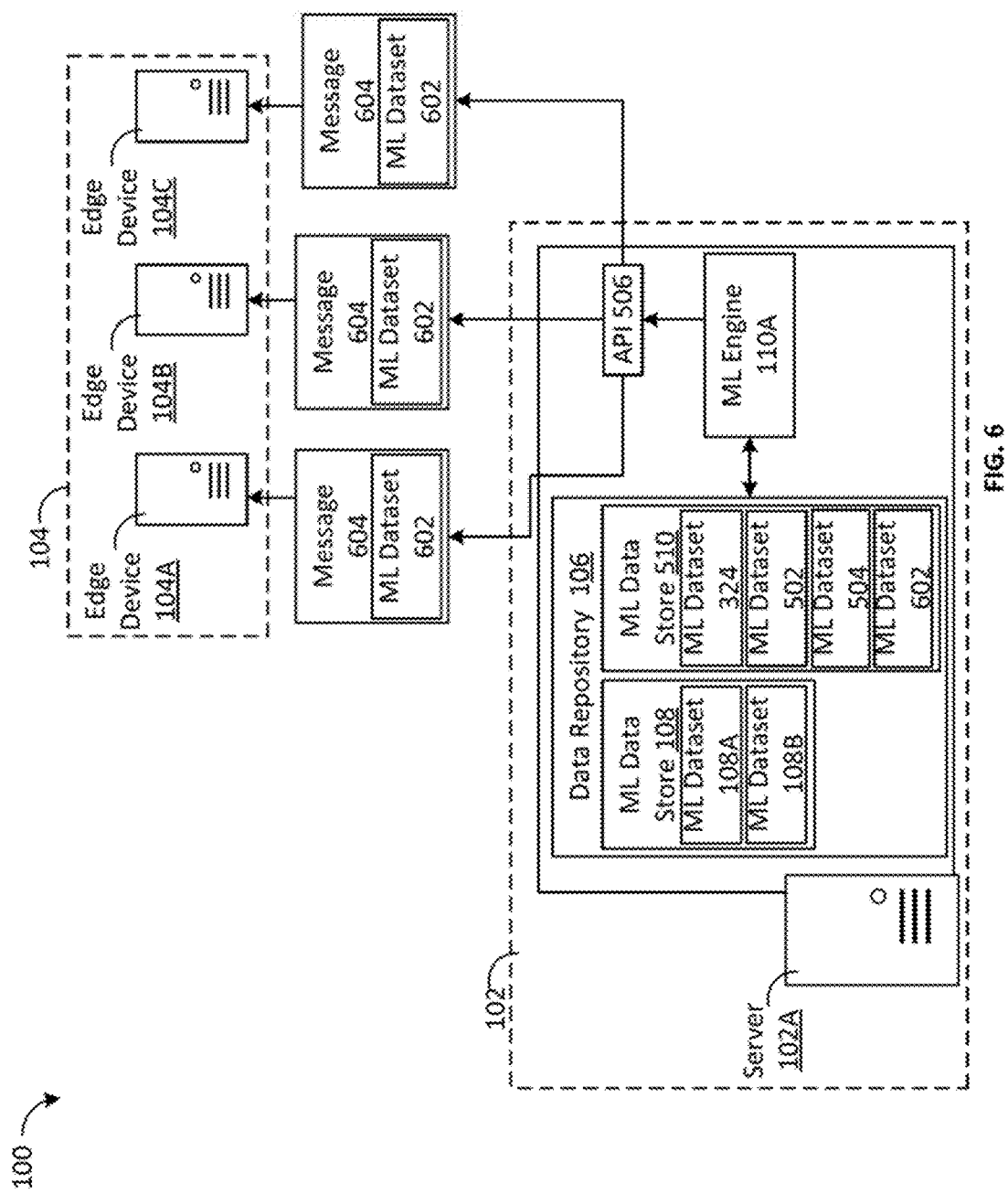

In various examples, executed ML engine 110A may perform operations that update ML dataset of a trained machine learning process, such as a trained machine learning process 202, stored in datacenter computing system 102, such as data repository 106, based on the ML datasets received from each of the edge devices 104. As described herein, the ML datasets received from each of the edge devices 104, may correspond to a retrained machine learning process that was retrained by the corresponding edge device 104. For example, referring to FIG. 6, executed ML engine 110A may access ML dataset 324, ML dataset 502 and ML dataset 504 and aggregate the values of one or more model parameters identified in ML dataset 324, ML dataset 502 and ML dataset 504. In some examples, executed ML engine 110A may generate another ML dataset 602 that includes the aggregated values of the one or model parameters. In such examples, executed ML engine 110A may generate message 604 and package into portions of message 604, one or more portions of ML dataset 602. Additionally, executed ML engine 110A may broadcast message 604 to each of the edge devices 104, such as edge device 104A, edge device 104B and edge device 104C. That way, each edge device 104 that receives message 604 may then deploy an updated machine learning process in accordance with ML dataset 602. In some instances, as illustrated in FIG. 6, executed ML engine 110A may store ML dataset 602 within corresponding portions of data repository 106, such as ML data store 510.

In other examples, executed ML engine 110A may access ML dataset 108A stored in ML data store 108 and replace or update the values of the one or more parameters specified in ML dataset 108A with the aggregated values of the one or model parameters. In such examples, executed ML engine 110A may generate message 604 and package into portions of message 604, one or more portions of updated ML dataset 108A. Additionally, executed ML engine 110A may broadcast message 604 to each of the edge devices 104, such as edge device 104A, edge device 104B and edge device 104C. That way, each edge device 104 that receives message 604 may then deploy an updated machine learning model in accordance with updated ML dataset 108A.

In various examples, one edge device 104 may utilize discrepancy data of another edge device 104, such as discrepancy data 315, to retrain a trained machine learning model deployed on the corresponding edge device 104, such as the first trained machine learning model 202 of ML dataset 108A. Additionally, as described herein, the discrepancy data may include response data, such as response data 319. In such examples, the edge devices 104 may share discrepancy data with one another for purposes of retraining the trained machine learning model.

For instance, edge device 104A and edge device 104B may each have received from datacenter computing system 102, such as server 102A, ML dataset 108A of a first trained machine learning process, such as first trained machine learning process 202, and ML dataset 108B of a second trained machine learning process, such as second trained machine learning process 204. As described herein, each the first trained machine learning process and the second trained machine learning process may be associated with object detection and recognition of images of sensor data generated by corresponding edge device 104A or edge device 104B. In such an instance, edge device 104A may deploy and apply the first trained machine learning process to one or more images, such as the first image, of sensor data 312 generated by sensor unit 116A, in accordance with the corresponding ML dataset. Additionally, edge device 104A may deploy and apply the second trained machine learning process to one or more images, such as the first image, of sensor data 312 generated by sensor unit 116A, in accordance with the corresponding ML dataset. Based on such applications, the first trained machine learning process may generate a first ground truth data and the second trained machine learning process may generate a second ground truth data. As described herein, the first ground truth data and the second ground truth data may each identify one or more objects in each of the one or more images of the sensor data. Moreover, edge device 104A may generate discrepancy data 315 based on the first ground truth data and the second ground truth data. In some instance, discrepancy data 315 may include one or more portions of response data 319. Additionally, discrepancy data 315 along with response data 319 may indicate that an object detection or recognition discrepancy exists for one or more images in sensor data 312. Further, edge device 104A may transmit, over communications network 120 and to edge device 104B, discrepancy data 315. Edge device 104B, similar to the processes and operations as described herein with regard to edge device 104A, may retrain the first trained machine learning process based on discrepancy data 315.

As described herein, discrepancy data, such as discrepancy data 315, may include one or more portions of each image associated with each determined discrepancy. In some examples, the one or more portions of each image associated with each determined discrepancy may include sensitive information (e.g., faces of individuals, license plates, etc.). In such examples, the edge devices 104 may perform operations, including but not limited to AI powered techniques for anonymization, that anonymize the one or more areas of each of the one or more portions of each image included in the discrepancy data (e.g., blurring a face of an individual that may be in a portion of a first image, blurring a license plate that may be in another portion of the first image, etc.). That way areas of each of the one or more portions of each image included in the discrepancy data that may include the aforementioned sensitive information may be removed or blurred, prior to an edge device 104 transmitting such discrepancy data to another edge device 104.

In some examples, an edge device 104 may be a datacenter (e.g., a local datacenter). For example, a particular data privacy sensitive country or geographic region may include one or more edge devices 104 that may be a datacenter ("datacenter-edge devices 104") and one or more edge devices 104 that may be a vehicle ("vehicle-edge devices 104"). Additionally, each of the one or more datacenter-edge devices 104 may communicate with a particular group of vehicle-edge devices 104 to obtain discrepancy data, such as discrepancy data 315, generated by each vehicle-edge device 104 of the particular group of vehicle-edge devices 104. Similar to executed ML module 304, each datacenter-edge device 104 may perform operations that retrain a trained machine learning process, such as first trained machine learning process 202, based on ML dataset associated with the trained machine learning process, such as ML dataset 108A, and discrepancy data, such as discrepancy data 315, received from one or more of the particular group of vehicle-edge devices 104 associated with the datacenter-edge device 104. In such examples, datacenter computing system 102 may transmit the ML dataset of the trained machine learning process to each datacenter-edge device 104 and each vehicle-edge device 104.

In examples where the trained machine learning process transmitted to each datacenter-edge device 104 and each vehicle-edge device 104 is associated with object detection and recognition, one or more datacenter-edge devices 104 may perform operations that determine whether a particular vehicle-edge device 104 may have detected an object that other vehicle-edge devices 104 may have missed. In such examples, the one or more datacenter-edge devices 104, may make such determinations based on a comparison between discrepancy data, such as discrepancy data 315, and ground truth data, such as ground truth data 314A of each of the vehicle-edge devices 104.

For instance, a first datacenter-edge device 104, and a group of vehicle-edge devices 104 may each receive, from ML dataset 108A of a first trained machine learning process, such as first trained machine learning process 202, and ML dataset 108B of a second trained machine learning process, such as second trained machine learning process 204. Additionally, each the first trained machine learning process and the second trained machine learning process may be associated with object detection and recognition of images of sensor data generated by corresponding vehicle-edge device 104. Moreover, each of the group of vehicle-edge devices 104 may deploy and apply the first trained machine learning process to one or more images, such as the first image, of sensor data generated by a sensor unit of the corresponding vehicle-edge device 104, in accordance with the corresponding ML dataset. Further, each of the group of vehicle-edge devices 104 may deploy and apply the second trained machine learning process to one or more images, such as the first image, of sensor data generated by a sensor unit of the corresponding vehicle-edge device 104, in accordance with the corresponding ML dataset. Based on such applications and for each of the group of vehicle-edge devices 104, the first trained machine learning process may generate a first ground truth data and the second trained machine learning process may generate a second ground truth data. As described herein, the first ground truth data and the second ground truth data may each identify one or more objects in each of the one or more images of the sensor data. Additionally, as described herein, each of the particular vehicle-edge device 104 and the other vehicle-edge devices 104, similar to edge device 104A, may perform operations that determine whether, for each image of the sensor data, there are any discrepancies between the first ground truth data and the second ground truth data.

In some instances, one or more vehicle-edge devices 104 of the group of vehicle-edge devices 104 may determine that one or more images of the corresponding sensor data may not have any discrepancies. In such examples, the corresponding vehicle-edge devices 104 may tag or label such images as not having any associated discrepancies between the first ground truth data and the second ground truth data. Additionally, the corresponding vehicle-edge devices 104 may generate consistency data based on the determined one or more images of the corresponding sensor data that do not have any discrepancies between the corresponding first ground truth data and the corresponding second ground truth data. The consistency data may include the one or more images that were determined to not have any discrepancies between the corresponding first ground truth data and the corresponding second ground truth data, as well as data identifying, for each of the one or more images, one or more objects.

In other instances, based on any determined discrepancies, each of the group of vehicle-edge devices 104, similar to edge device 104A, may perform operations that generate discrepancy data, such as discrepancy data 315. The discrepancy data may include, for the corresponding image, one or more portions of the corresponding image, such as a particular region of interest in the first image that includes the discrepancy. As described herein, the discrepancy data may further include response data associated with the corresponding image.

Additionally, datacenter-edge device 104 may utilize consistency data to retrain the trained machine learning process. For instance, following the example above, a first datacenter-edge device 104 may obtain from each of the group of vehicle-edge devices 104, consistency data and/or discrepancy data. Additionally, based on the consistency data and/or discrepancy data, the first datacenter-edge device 104 may compare the one or more images or portions of images included in the discrepancy data to the one or more images included in the consistency data. Based on the comparison, the first datacenter-edge device 104 may determine which of the one or more images included in the consistency data has a matching image or portions of an image from the discrepancy data. Moreover, the first datacenter-edge device 104 may determine, for each matched image of the consistency data, the corresponding data that identifies the one or more objects in the corresponding matched image. That way, instead of utilizing only discrepancy data to retrain the trained machine learning process, the first datacenter-edge device 104 may utilize consistency data associated with each matched image of the consistency data (e.g., the determined data that identifies the one or more objects in the corresponding matched image), when retraining the first trained machine learning process. For images or portions of images of the discrepancy data the first datacenter-edge device 104 may not have determined there is a matching image in the consistency data, first datacenter-edge device 104 may utilize portions of the discrepancy data corresponding to the unmatched images or portions of images of the discrepancy data, when retraining the first trained machine learning process.

Upon each datacenter-edge device 104 retraining a trained machine learning process, such as first machine learning process 202, the corresponding datacenter-edge device 104 may perform operations, similar to executed ML module 304, that generate and transmit an update message, such as updated message 370, across communications network 120 via a channel of communications established programmatically between API 501 and the datacenter-edge device 104. As described herein, the update message may include an ML dataset of the retrained machine learning process. Moreover, datacenter computing system 102, such as executed ML engine 110A, may perform operations that update a ML dataset of the trained machine learning process, such as ML dataset 108A of trained machine learning process 202, stored in datacenter computing system 102, such as data repository 106, based on the ML dataset included in each update message received from each datacenter-edge device 104. Further, as described herein, datacenter computing system 102, such as executed ML engine 110A, may perform operations that generate a message, such as message 604, that includes one or more portions of the updated ML dataset, and broadcast or transmit the message to each of the vehicle-edge devices 104 directly or via a corresponding datacenter-edge device 104.

Figure 7:
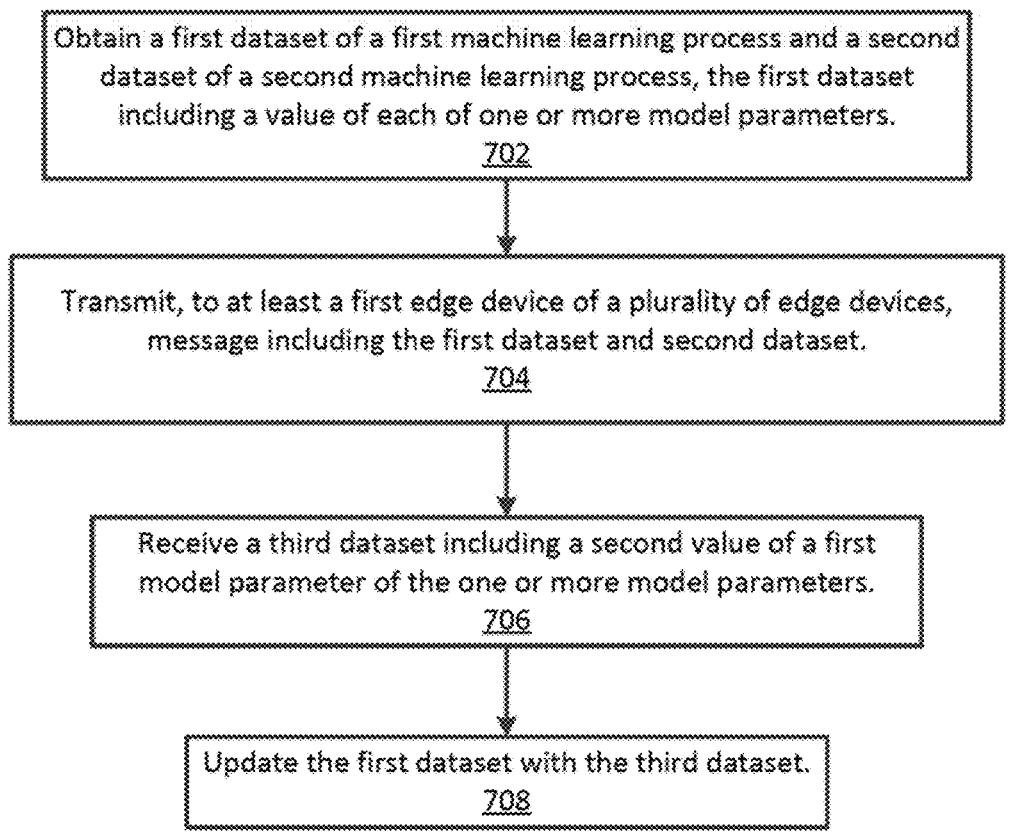
FIG. 7 is a flowchart of an exemplary process 700 for updating a machine learning (ML) dataset of a first trained machine learning process, in accordance with some exemplary embodiments.

FIG. 7 is a flowchart of an exemplary process 700 for updating a dataset of a first machine learning process, in accordance with some exemplary embodiments. For example, one or more computing systems, such as datacenter computing system 102, may perform one or more of the steps of exemplary process 700, as described below in reference to FIG. 7. Referring to FIG. 7, datacenter computing system 102 may perform any of the processes described herein to obtain from a database, (i) a first dataset of a first trained machine learning process associated with a first type of object detection and recognition and (ii) a second dataset of a second trained machine learning process associated with a second type of object detection and recognition (e.g., in step 702 of FIG. 7). As described herein, the first dataset may include a value of each of one or more model parameters of the first trained machine learning process and the second dataset may include value of each of one or more model parameters of the first trained machine learning process. In some instances, the first trained machine learning process may be a bounding block machine learning process, while the second trained machine learning process may be a semantic segmented machine learning process.

In some examples, upon execution by one or more processors of server 102A of datacenter computing system 102, executed ML engine 110A of server 102A of datacenter computing system 102 may perform operations that access data repository 106 (e.g., as maintained within the one or more tangible, non-transitory memories of datacenter computing system 102), and obtain a machine learning (ML) dataset of each of the one or more trained machine learning processes, such as ML dataset 108A of a first trained machine learning process 202 and ML dataset 108B of a second trained machine learning process 204.

Referring back to FIG. 7, datacenter computing system 102 may perform any of the processes described herein to transmit, to a first edge device of a plurality of edge devices via the communications interface, a message including the first dataset and the second dataset (e.g., in step 704 of FIG. 7). As described herein, executed ML engine 110A may generate a message, such as message 206, and packaged one or more portions of first dataset and second dataset into portions of the message. Moreover, executed ML engine 110A may transmit the message to each of the edge devices 104, including first edge device 104A. Additionally, each of the plurality of edge devices 104, may generate and transmit to datacenter computing system 102 a third dataset, such as update message 370.

As described herein, each of the plurality of edge devices, such as first edge device 104A may perform operations that configure and deploy each trained machine learning process in accordance with a corresponding ML dataset included in the message, such as message 206. Additionally, each edge device may retrain one trained machine learning process based on ground truth data generated from the one trained machine learning process and ground truth data generated by another trained machine learning process. Further, each edge device may generate a third dataset, such as update message 370, and package into portions of the third dataset data identifying and characterizing a value of each of one or more model parameters of the retrained machine learning process. In various instances, the value of one or more model parameters of the retrained machine learning process may differ from the value of one or more model parameters of the originally trained machine learning process counterpart. In examples where the deployed trained machine learning models are associated with object detection and recognition, each of the deployed trained machine learning models may be applied to one or more images included in the sensor data, such as sensor data 312 (e.g., generated by one or more sensors of sensor unit 116A).

Referring back to FIG. 7, datacenter computing system 102 may perform any of the processes described herein to receive, from the first edge device, a third dataset (e.g., in step 706 of FIG. 7). Additionally, datacenter computing system 102 may perform any of the processes described herein to update a portion of the first dataset with the third dataset (e.g., in step 708 of FIG. 7). As described herein, the third dataset may include a second value of a first model parameter of the one or more model parameters and the updated portion of the first dataset including the second value of the parameter.

In some examples, server 102A of datacenter computing system 102 may perform operations that obtain one or more update messages, such as update message 370, update message 506 and update message 508, that include ML datasets of retrained machine learning processes (e.g., a retrained first trained machine learning process 202), from one or more edge devices 104, such as first edge device 104A. Additionally, server 102A may parse each of the received update messages to obtain one or more portions of the corresponding ML dataset. Moreover, server 102A may perform operations that update a corresponding ML dataset of a trained machine learning process stored in the database, such as ML data store 108, based on the ML dataset of each of the one or more update messages. For instance, server 102A may obtain, from ML data store 510, a dataset of retrained machine learning processes of each of the received update messages, such as ML dataset 324, ML dataset 502 and ML dataset 504. Additionally, server 102A may aggregate the values of one or more model parameters identified in ML dataset 324, ML dataset 502 and ML dataset 504. Moreover, server 102A may obtain, from the ML data store 108, a ML dataset of a trained machine learning process (e.g., first trained machine learning process 202) that corresponds to the retrained machine learning processes and replace or update the values of the one or more parameters specified in the ML dataset with the aggregated values of the one or more model parameters. In some instances, server 102A may generate a message 604 and package into portions of message 604, one or more portions of the updated ML dataset and broadcast message 604 to each of the plurality of edge devices 104. That way, each of the plurality of edge devices 104 may deploy an updated first machine learning process in accordance with the one or more model parameters of message 604.

In other instances, server 102A may generate another ML dataset, such as ML dataset 602, that includes the aggregated values of the one or more model parameters. In such instances, executed ML engine 110A may generate a message, such as message 604, and packaged into portions of message 604, one or more portions of ML dataset 602. Additionally, server 102A may broadcast message 604 to each of the plurality of edge devices 104. That way, each of the plurality of edge devices 104 may deploy an updated first machine learning process in accordance with the one or more model parameters of message 604

Figure 8:
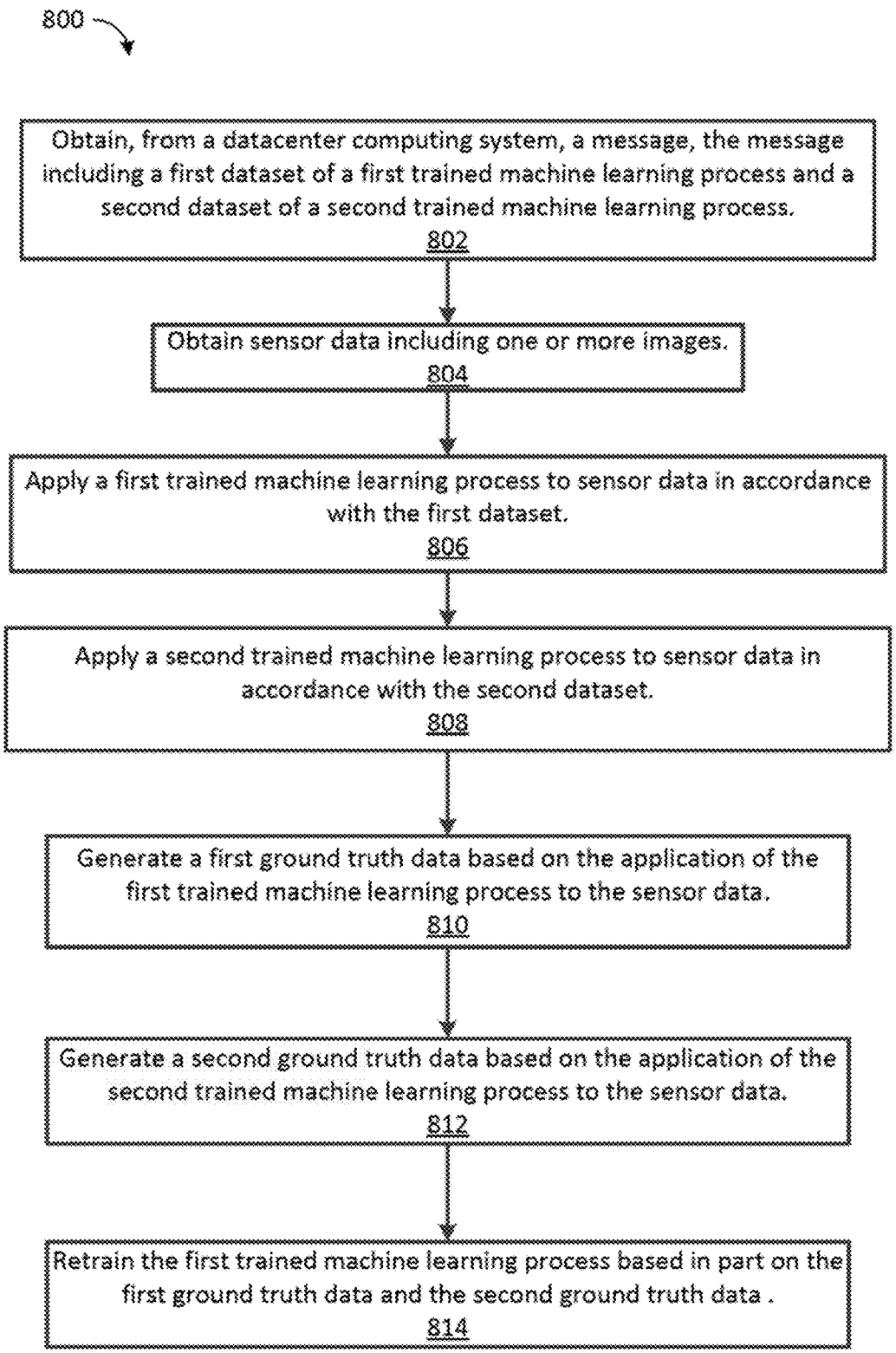
FIG. 8 is a flowchart of an exemplary process 800 for generating ground truth data, in accordance with some exemplary embodiments.

FIG. 8 is a flowchart of an exemplary process 800 for generating ground truth data, in accordance with some exemplary embodiments. For example, one or more edge devices 104, such as edge device 104A, 104B and 104C may perform one or more of the steps of exemplary process 800, as described below in reference to FIG. 8. Referring to FIG. 8, a first edge device 104A of a plurality of edge devices 104, may perform any of the processes described herein to obtain, from a datacenter computing system 102, a message (e.g., in step 802 of FIG. 8). As described herein, message 206 may include ML datasets of one or more trained machine learning processes, such as ML dataset 108A of a first trained machine learning process 202 and ML dataset 108B of a second trained machine learning process 204. Further, each ML dataset may include one or more model parameters of the corresponding trained machine learning process and a value for each of the one or more model parameters. In some examples, each of the one or more trained machine learning processes may be associated with object detection and recognition. Examples of such trained machine learning processes include a bounding box machine learning process, a semantic segmentation machine learning process, an instance segmentation machine learning process, and a panoptic segmentation machine learning process.

Additionally, the first edge device 104A may further perform any of the processes described herein to obtain sensor data 312 including one or more images (e.g., in step 804 of FIG. 8). As described herein, each edge device 104, such as the first edge device 104A, may include a sensor unit 116A. Additionally, the sensor unit may include one or more sensors, such as an optical sensor. In some instances, the optical sensor may generate sensor data 312 that includes one or more images of a particular scene at a particular point in time of an environment the edge device 104 is in. Further, each of the one or more images may include one or more objects.

Moreover, the first edge device 104A may further perform any of the processes described herein to apply a first trained machine learning process to sensor data in accordance with the first dataset included in the message (e.g., in step 806 of FIG. 8), and apply a second trained machine learning process to sensor data 312 in accordance with the second dataset included in message 206 (e.g., in step 808 of FIG. 8). Further, the first edge device 104A may perform any of the processes described herein to generate first ground truth data based on the application of the first train machine learning process 202 to sensor data 312 (e.g., in step 810 of FIG. 8), and generate second ground truth data 314B based on the application of the second trained machine learning process 204 to sensor data 312 (e.g., in step 812 of FIG. 8).

As described herein, each of the edge devices 104, such as edge device 104A may perform operations that configure the first trained machine learning process 202 based on the first ML dataset 108A and configure the second trained machine learning process 204 based on the second ML dataset 108A. Once each of the edge devices 104 has configured the first trained machine learning process 202 and second trained machine learning process 204, each of the edge devices 104 may utilize sensor data 312 as inputs to each of the first trained machine learning process 202 and second trained machine learning process 204 to generate ground truth data, such as ground truth data 314A and ground truth data 314B respectively. As described herein, the ground truth data may identify one or more objects within one or more images included in sensor data, such as sensor data 312 generated by sensor unit 116A.

Referring back to FIG. 8, the first edge device 104A may further perform any of the processes described herein to retrain the first trained machine learning process based in part on the first ground truth data and the second ground truth data (e.g., in step 814 of FIG. 8). In some instances, the retrained first trained machine learning process may be associated with a second value of the first model parameter of the plurality of model parameters. As described herein, each of the edge devices 104 may perform operations that determine whether an object detection or recognition discrepancy exists for any of the one or more images included in sensor data 312 between the first trained machine learning process 202 and the second trained machine learning process 204.

For example, each of the edge devices 104 may identify one or more portions of first ground truth data associated with a first image of sensor data, such as sensor data 312 and one or more portions of second ground truth data associated with the first image. The one or more portions of first ground truth data and one or more portions of second ground truth data may identify one or more regions of interest within the first image and one or more identified objects within each of the one or more regions of interest. Additionally, based on the identified one or more portions of the first ground truth data and identified one or more portions of the second ground truth data, each of the edge devices 104 may determine which regions of interest of the first ground truth data match regions of interest of the second ground truth data. Further, each of the edge devices 104 may determine whether there are any object detection and recognition discrepancies between each matching regions. For instance, each of the edge devices 104 may determine, for a particular region of interest in the first image, an object recognition discrepancy exists, if each of the edge devices 104 determines portions of the first ground truth data identifies, for the particular region of interest, an object, such as a traffic sign, while portions of the second ground truth data identify, for the same particular region of interest, no object. Based on each determined discrepancy of one or more images, such as the first image, each of the edge devices 104 may generate discrepancy data that identifies and characterizes each determined discrepancy. In some examples, discrepancy data may include one or more portions of each image associated with each determined discrepancy. Additionally, discrepancy data may include data that identifies or indicates where on each corresponding image the object recognition discrepancy between first ground truth data and second ground truth data is located or determined to exist.

Additionally, each of the edge devices 104 may utilize the discrepancy data to retrain the first trained machine learning model. For example, each of the edge devices 104 may obtain ML dataset of the first trained machine learning process and the discrepancy data. Additionally, each of the edge devices 104 may retrain the first trained machine learning process based on ML dataset and discrepancy data. Further, a value of one or more model parameters specified in ML dataset of the first trained machine learning process may be changed or adjusted because the corresponding edge device 104 has retrained or is retraining the first trained machine learning process based on the ML dataset 108A and discrepancy data 315.

Referring back to FIG. 8, the first edge device 104A my further perform any of the processes described herein to generate a third dataset that includes the second value of the first parameter (e.g., in step 816 of FIG. 8). In some examples, each of the edge devices 104 may generate another or an additional ML dataset of the retrained first trained machine learning process. The additional ML dataset may include data specifying a value of one or more model parameters associated with the retrained first trained machine learning process 202. For instance, ML dataset of the first trained machine learning process may include data specifying at least a first value of a first model parameter, while the ML dataset of the retrained first trained machine learning process may include data specifying at least a second value of the first model parameter. The second value of the first model parameter may be different and the first value of the first model parameter.

Additionally, upon retraining the first trained machine learning process, each of the edge devices 104 may perform operations that generate a third dataset or update message including data specifying values of one or more parameters of the retrained first trained machine learning process. Moreover, each of the edge devices 104 may transmit to server 102A and across communications network 120 via a channel of communications established programmatically between server 102A and the corresponding edge device 104, the third dataset.

Figure 9:
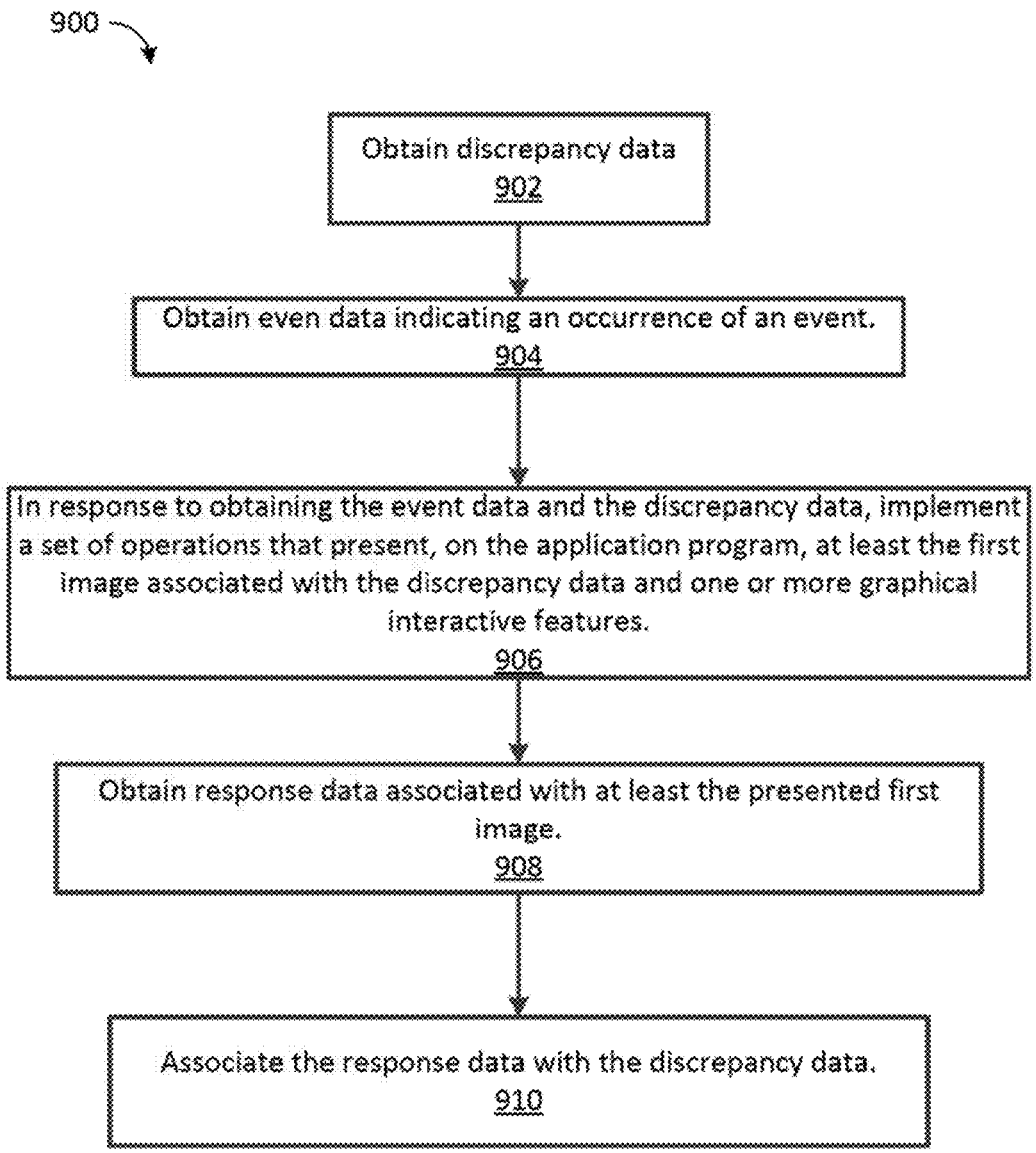
FIG. 9 is a flowchart of an exemplary process 900 for incorporating annotations to discrepancy data, in accordance with some exemplary embodiments.

FIG. 9 is a flowchart of an exemplary process 900 for incorporating annotations to discrepancy data. For example, one or more edge devices 104, such as edge device 104A, 104B and 104C may perform one or more of the steps of exemplary process 900, as described below in reference to FIG. 9. Referring to FIG. 9, a first edge device 104A of a plurality of edge devices 104, may obtain discrepancy data (e.g., in step 902 of FIG. 9). Additionally, a first edge device 104A of a plurality of edge devices 104, may obtain event data indicating an occurrence of an event.

As described herein, each of the edge devices 104 may perform operations that generate a notification message based on the obtained discrepancy data. In some instances, notification message may include, among other things, one or more portions of discrepancy data. For instance, the notification may include one or more portions of one or more images of sensor data associated with each determined discrepancy of the discrepancy data. In some instances, notification message may include data that identifies or indicates where on each corresponding image the object recognition discrepancy between ground truth data of one trained machine learning process and ground truth data of another trained machine learning process, is located or determined to exist.

Additionally, each of the edge devices 104 may perform operations that generate interface elements based on the notification message, and route the interface elements to a display unit of the corresponding edge device 104, such as display unit 116B of edge device 104A. In some instances, when rendered for presentation within a corresponding notification interface by the display unit, the interface elements may provide a graphical representation of the notification message to the user, such as user 101. In some examples, the graphical representation of the notification message may include one or more portions of an image associated with at least one determined discrepancy associated with the notification message. In other examples, when presented on a display unit of the corresponding edge device 104, the graphical representation of the notification message may prompt the user to provide annotations or additional data characterizing the object recognition discrepancy associated with the notification message. For instance, the graphical representation of the notification message may prompt the user to confirm whether the image includes an object, such as a stop sign, based on additional input provided to an input unit of the corresponding edge device 104, such as input unit 116C of edge device 104A, that selects a respective one of an "YES" icon, and a "NO" icon presented within a corresponding user interface. Additionally, in some instances, the user interface may enable the user to provide an input that indicates what the object may be, such as, the stop sign. For instance, the user interface may include text box input field or multi-choice selection that may enable the user to provide an input that indicates what the object might be in the image.

In various examples, each of the edge devices 104 may present the graphical representation of the notification message in response to obtaining event data from one or more additional sensors of a sensor unit of the corresponding edge device 104. In some instances, the edge device 104, such as edge device 104A may be a vehicle or an autonomous vehicle. Further, the event data may indicate a detected event such as, the vehicle being parked, fueled, and/or charged.

For instance, the one or more additional sensors of the sensor unit may detect that the vehicle or autonomous vehicle has parked (e.g., a charging event such as, the engine being turned off, the vehicle is put into park mode, etc.). Additionally, the one or more additional sensors may generate event data indicating the parking event. In another instance, the one or more additional sensors of the sensor unit may detect that fuel is blowing into the fuel tank of the vehicle or autonomous vehicle has parked. Additionally, the one or more additional sensors may generate event data indicating the fueling event. In yet another instance, the one or more additional sensors of the sensor unit may detect that a battery of the vehicle or autonomous vehicle is being charged or that the battery of the vehicle or autonomous vehicle is electrically coupled to a charging unit/station. Additionally, the one or more additional sensors may generate event data indicating the charge event.

Referring back to FIG. 9, the first edge device 104A may further perform any of the processes described herein to present, on an application program associated with the datacenter computing system 102, at least a first image associated with the discrepancy data and one or more graphical interactive features, in response to obtaining the event data and the discrepancy data (e.g., in step 906 of FIG. 9). As described herein, in response to obtaining the event data, each of the edge devices 104 may perform any of the processes described herein to generate a notification message based on the discrepancy data. Additionally, each of the edge devices 104 may generate and present interface elements on the corresponding display unit, based on the notification message. Alternatively, in other instances, each of the edge devices 104 may perform any of the processes described herein to generate a notification message based on the discrepancy data. Additionally, in response to obtaining the event data, each of the edge devices 104 may generate and present the interface elements on the corresponding display unit, based on the notification message.

Referring back to FIG. 9, the first edge device 104A may further perform any of the processes described herein to obtain response data associated with at least the presented first image (e.g., in step 908 of FIG. 9). In some examples, response data may include input data responsive to the interface elements and indicative of the annotations or additional data the user, such as user 101, has provided with respected to the presented object recognition discrepancy. Additionally, each of the edge devices 104 may package all, or a selected portion of the input data into portions of the response data.

As described herein, in some instances, the input data of the user may indicate that the user had confirmed the presented image associated with the determined object recognition discrepancy of a particular region of interest of the image, such as a first image of sensor data 312, includes an object. For instance, the graphical representation of the notification message may include the image of an object, such as a stop sign that was identified in a second ground truth data but not in a first ground truth data, along with a prompt requesting confirmation of whether the image includes an object (e.g., "is there an object in the displayed image?"). Additionally, the user data may indicate that the user selected a "YES" icon, and in some examples, the user data may further include data identifying what the object might be in the image based on the input the user provided in a text box input field (e.g., a stop sign) or multi-choice selection. Moreover, each of the edge devices 104 may generate the response data to include one or more portions of the input data.

In other instances, the input data of the user may indicate that the user had confirmed the presented image associated with the determined object recognition discrepancy of a particular region of interest of an image, such as a first image of sensor data 312, does not include an object. For instance, the graphical representation of the notification message may include the image of an environment around edge device 104, along with a prompt requesting confirmation of whether the image includes an object (e.g., "is there an object in the displayed image?"). In such an instance, a first ground truth data may indicate that an object is identified in the image, however the second ground truth data may indicate that no object was identified in the image. Additionally, input data may indicate that the user selected the "NO" icon. Moreover, each of the edge devices 104 may generate the response data to include one or more portions of the input data.

Referring back to FIG. 9, the first edge device 104A may further perform any of the processes described herein to associate the response data with the discrepancy data (e.g., in step 910 of FIG. 9). In some examples, each of the edge devices 104 may package one or more portions of the response data into a portions of a corresponding discrepancy data. As described herein, one or more portions of the discrepancy data may include data identifying and characterizing the determined associated discrepancy and one or more portions of an image, such as the first image, that is associated with the determined associated discrepancy.

Implementation examples are further described in the following numbered clauses:

1. An apparatus comprising:
   a communications interface;
   a non-transitory, machine-readable storage medium storing instructions; and
   at least one processor coupled to the communications interface, and the non-transitory, machine-readable storage medium, the at least one processor configured to execute the instructions to:
   obtain, from a database, (i) a first dataset of a first trained machine learning process associated with a first type of object detection and recognition and (ii) a second dataset of a second trained machine learning process associated with a second type of object detection and recognition, the first dataset including at least a first value of a parameter of the first trained machine learning process;
   transmit, to a first edge device of a plurality of edge devices via the communications interface, a message including the first dataset and the second dataset, the message causing the first edge device to:
  apply the first trained machine learning process to sensor data in accordance with the first dataset;
  apply the second trained machine learning process to the sensor data in accordance with the second dataset;
  generate first ground truth data based on the application of the first trained machine learning process to the sensor data;
  generate second ground truth data based on the application of the second trained machine learning process to the sensor data;
  perform operations that retrain the first trained machine learning process based in part on the first ground truth data and the second ground truth data, the retrained first trained machine learning process being associated with a second value of the parameter of the first trained machine learning process; and
  generate a third dataset including the second value of the parameter; and
receive, from the first edge device, the third dataset, and update a portion of the first dataset with the third dataset, the updated portion of the first dataset including the second value of the parameter.

2. The apparatus of clause 1, wherein the at least one processor is further configured to:
  transmit, to one or more other edge devices of the plurality of edge devices, the message including the first dataset and the second dataset;
  receive, from each of the one or more other edge devices, a machine learning (ML) dataset including data to update the first dataset of the first trained machine learning process; and
  update the first dataset with the corresponding ML dataset received from each of the one or more other edge devices.

3. The apparatus of clause 2, wherein the message causes each of the one or more other edge devices to:
  apply the first trained machine learning process to sensor data in accordance with the first dataset, the sensor data being associated with the corresponding edge device of the one or more edge devices;
  apply the second trained machine learning process to the sensor data in accordance with the second dataset;
  generate third ground truth data based on the application of the first trained machine learning process to the sensor data;
  generate fourth ground truth data based on the application of the second trained machine learning process to the sensor data;
  perform operations that retrain the first trained machine learning process based in part on the third ground truth data and the fourth ground truth data, the retrained first trained machine learning process being associated with a second value of the parameter; and
  generate the ML dataset including the second value of the parameter.

4. The apparatus of clause 1, wherein the at least one processor is further configured to:
transmit the updated first dataset to at least a second edge device of the plurality of edge devices.

5. The apparatus of any of clauses 1-4, wherein the first trained machine learning process comprises a trained, bounding box machine learning process.

6. The apparatus of any of clauses 1-4, wherein the second trained machine learning process comprises a trained semantic segmentation machine learning process.

7. The apparatus of any of clauses 1-4, wherein the second trained machine learning process comprises a trained instance segmentation machine learning process.

8. The apparatus of any of clauses 1-4, wherein the second trained machine learning process comprises a trained panoptic segmentation machine learning process.

9. The apparatus of any of clauses 1-8, wherein the first edge device includes one or more sensors that generate the sensor data, and wherein the message further causes the first edge device to:
  determine one or more discrepancies between one or more elements of the first ground truth data and one or more elements of the second ground truth data; and
  generate the third dataset based on the one or more determined discrepancies.

10. The apparatus of any of clauses 1-9, wherein the sensor data includes one or more images, the first ground truth data identifies one or more objects within a first image of the one or more images, and the second ground truth data identifies one or more objects within the first image, and wherein the message further causes the first edge device to determine the one or more discrepancies by comparing the one or more objects within the first image of the first ground truth data with the one or more objects of within the first image of the second ground truth data.

11. The apparatus of any of clauses 1-10, wherein the message further causes the first edge device to:
  display the first image;
  receive, from an input unit communicatively coupled to the first edge device, response data in response to displaying the first image;
  update the first dataset based on the determined one or more discrepancies and the response data; and
  generate the third dataset based on the updated first dataset.

12. The apparatus of any of clauses 1-11, wherein the plurality of edge devices includes at least one vehicle.

13. The apparatus of any of clauses 1-12, wherein the message causes the first edge device to:
  generate discrepancy data based on the first ground truth data and the second ground truth data; and
  transmit the discrepancy data to a second edge device of the plurality of edge devices, the second edge device being configured to perform operations that retrain the first trained machine learning process based in part on the discrepancy data.

14. The apparatus of any of clauses 1-12, wherein the message causes the first edge device to:
  generate discrepancy data based on the first ground truth data and the second ground truth data; and
  transmit the discrepancy data to a second edge device of the plurality of edge devices, the second edge device being configured to perform operations that retrain the first trained machine learning process based in part on the discrepancy data and consistency data received from a third edge device.

15. The apparatus of clause 14, wherein the second edge device is a local datacenter.

16. A non-transitory, machine-readable storage medium storing instructions that, when executed by at least one processor of a server, causes the at least one processor to perform operations that include:
obtaining, from a database, (i) a first dataset of a first trained machine learning process associated with a first type of object detection and recognition and (ii) a second dataset of a second trained machine learning process associated with a second type of object detection and recognition, the first dataset including at least a first value of a parameter of the first trained machine learning process;
transmitting, to a first edge device of a plurality of edge devices, a message including the first dataset and the second dataset, the message causing the first edge device to:
apply the first trained machine learning process to sensor data in accordance with the first dataset;
apply the second trained machine learning process to the sensor data in accordance with the second dataset;
generate first ground truth data based on the application of the first trained machine learning process to the sensor data;
generate second ground truth data based on the application of the second trained machine learning process to the sensor data;
perform operations that retrain the first trained machine learning process based in part on the first ground truth data and the second ground truth data, the retrained first trained machine learning process being associated with a second value of the parameter; and
generate a third dataset including the second value of the parameter; and
receive, from the first edge device, the third dataset and update a portion of the first dataset with the third dataset, the updated portion of the first dataset including the second value of the parameter.

17. A computer-implemented method by at least one processor, the computer-implemented method comprising:
obtaining, by the at least one processor and from a database, (i) a first dataset of a first trained machine learning process associated with a first type of object detection and recognition and (ii) a second dataset of a second trained machine learning process associated with a second type of object detection and recognition, the first dataset including at least a first value of a parameter of the first trained machine learning process;
transmitting, by the at least one processor and to a first edge device of a plurality of edge devices, a message including the first dataset and the second dataset, the message causing the first edge device to:
apply the first trained machine learning process to sensor data in accordance with the first dataset;
apply the second trained machine learning process to the sensor data in accordance with the second dataset;
generate first ground truth data based on the application of the first trained machine learning process to the sensor data;
generate second ground truth data based on the application of the second trained machine learning process to the sensor data;
perform operations that retrain the first trained machine learning process based in part on the first ground truth data and the second ground truth data, the retrained first trained machine learning process being associated with a second value of the parameter; and
generate a third dataset including the second value of the parameter; and
receive, by the at least one processor and from the first edge device, the third dataset and update a portion of the first dataset with the third dataset, the updated portion of the first dataset including the second value of the parameter.

18. The computer-implemented method of clause 17, wherein the at least one processor is further configured to:
transmit, to one or more other edge devices of the plurality of edge devices, the message including the first dataset and the second dataset;
receive, from each of the one or more other edge devices, a machine learning (ML) dataset including data to update the first dataset of the first trained machine learning process; and
update the first dataset with the corresponding ML dataset received from each of the one or more other edge devices.

19. The computer-implemented method of clause 18, wherein the message causes each of the one or more other edge devices to:
apply the first trained machine learning process to sensor data in accordance with the first dataset, the sensor data being associated with the corresponding edge device of the one or more edge devices;
apply the second trained machine learning process to the sensor data in accordance with the second dataset;
generate third ground truth data based on the application of the first trained machine learning process to the sensor data;
generate fourth ground truth data based on the application of the second trained machine learning process to the sensor data;
perform operations that retrain the first trained machine learning process based in part on the third ground truth data and the fourth ground truth data, the retrained first trained machine learning process being associated with a second value of the parameter; and
generate the ML dataset including the second value of the parameter.

20. The computer-implemented method of any of clauses 17-19, further comprising:
transmitting the updated first dataset to at least a second edge device of the plurality of edge devices.

21. The computer-implemented method of any of clauses 17-19, wherein the first trained machine learning process comprises a trained, bounding box machine learning process.

22. The computer-implemented method of any of clauses 17-19, wherein the second trained machine learning process comprises a trained semantic segmentation machine learning process.

23. The computer-implemented method of any of clauses 17-19, wherein the second trained machine learning process comprises a trained instance segmentation machine learning process.

24. The computer-implemented method of any of clauses 17-19, wherein the second trained machine learning process comprises a trained panoptic segmentation machine learning process.
25. The computer-implemented method of any of clauses 17-24, wherein the first edge device includes one or more sensors that generate the sensor data, and wherein the message further causes the first edge device to:
determine one or more discrepancies between one or more elements of the first ground truth data and one or more elements of the second ground truth data; and
generate the third dataset based on the one or more determined discrepancies.
26. The computer-implemented method of any of clauses 17-25, wherein the sensor data includes one or more images, the first ground truth data identifies one or more objects within a first image of the one or more images, and the second ground truth data identifies one or more objects within the first image, and wherein the message further causes the first edge device to determine the one or more discrepancies by comparing the one or more objects within the first image of the first ground truth data with the one or more objects of within the first image of the second ground truth data.
27. An apparatus comprising:
  a non-transitory, machine-readable storage medium storing instructions; and
  at least one processor coupled to the non-transitory, machine-readable storage medium, the at least one processor being configured to execute the instructions to:
    receive a message including (i) a first dataset of a first trained machine learning process associated with a first type of object detection and recognition and (ii) a second dataset of a second trained machine learning process associated with a second type of object detection and recognition, the first dataset including at least a first value of a parameter of the first trained machine learning process;
    apply the first trained machine learning process to sensor data in accordance with the first dataset;
    apply the second trained machine learning process to the sensor data in accordance with the second dataset;
    generate first ground truth data based on the application of the first trained machine learning process to the sensor data;
    generate second ground truth data based on the application of the second trained machine learning process to the sensor data;
    perform operations that retrain the first trained machine learning process based in part on the first ground truth data and the second ground truth data, the retrained first trained machine learning process being associated with a second value of the parameter; and
    generate a third dataset including the second value of the parameter, based on the first ground truth data and the second ground truth data; and
    transmit, to a computing system, the third dataset.
28. The apparatus of clause 27, wherein the at least one processor is further configured to:
determine one or more discrepancies by comparing the first ground truth data with the second ground truth data to determine discrepancies; and
generate the third dataset based on the determined one or more discrepancies.

C. Exemplary Hardware and Software Implementations

Embodiments of the subject matter and the functional operations described in this disclosure can be implemented in digital electronic circuitry, in tangibly-embodied computer software or firmware, in computer hardware, including the structures disclosed in this specification and their structural equivalents, or in combinations of one or more of them. Embodiments of the subject matter described in this disclosure, including machine learning (ML) engine 110A, application 112A, application programming interface (API) 302 and 501, ML module 304, analysis module 306, notification module 308, and response module 310 can be implemented as one or more computer programs, i.e., one or more modules of computer program instructions encoded on a tangible non-transitory program carrier for execution by, or to control the operation of, a data processing apparatus (or a computing system). Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, an application program, an engine, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) or an assisted Global Positioning System (AGPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, such as user 101, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the disclosure or of what may be claimed, but rather as descriptions of features specific to particular embodiments of the disclosure. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, unless otherwise specifically defined herein, all terms are to be given their broadest possible interpretation including meanings implied from the specification as well as meanings understood by those skilled in the art and/or as defined in dictionaries, treatises, etc. It is also noted that, as used in the specification and the appended claims, the singular forms "a," "an," and "the" include plural referents unless otherwise specified, and that the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship. In this disclosure, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the described subject matter.

The foregoing is provided for purposes of illustrating, explaining, and describing embodiments of this disclosure. Modifications and adaptations to the embodiments will be apparent to those skilled in the art and may be made without departing from the scope or spirit of the disclosure.

What is claimed is:

1. An apparatus comprising:
   a communications interface;
   a non-transitory, machine-readable storage medium storing instructions; and
   at least one processor coupled to the communications interface, and the non-transitory, machine-readable storage medium, the at least one processor configured to execute the instructions to:
   obtain, from a database, (i) a first dataset of a first trained machine learning process associated with a first type of object detection and recognition and (ii) a second dataset of a second trained machine learning process associated with a second type of object detection and recognition, the first dataset including at least a first value of a parameter of the first trained machine learning process;
   transmit, to a first edge device and one or more other edge devices of a plurality of edge devices via the communications interface, a message including the first dataset and the second dataset, the message causing the first edge device and the one or more other edge devices to:
      apply the first trained machine learning process to respective sensor data in accordance with the first dataset, the respective sensor data being associated with each edge device of the first edge device and the one or more other edge devices;
      apply the second trained machine learning process to the respective sensor data in accordance with the second dataset;
      perform operations that retrain the first trained machine learning process based in part on first respective ground truth data generated based on the application of the first trained machine learning process to the respective sensor data and second respective ground truth data generated based on the application of the second trained machine learning process to the respective sensor data, the retrained first trained machine learning process being associated with a second value of the parameter of the first trained machine learning process; and
      generate a respective dataset including the second value of the parameter;
   receive, from the first edge device and the one or more other edge devices, the respective dataset including the second value of the parameter; and
   update the first dataset with the respective dataset received from the first edge device and the one or more other edge devices, an updated portion of the first dataset including the second value of the parameter.

2. The apparatus of claim 1, wherein the at least one processor is further configured to:
   transmit the updated first dataset to at least a second edge device of the plurality of edge devices.

3. The apparatus of claim 1, wherein the first trained machine learning process comprises a trained, bounding box machine learning process.

4. The apparatus of claim 1, wherein the second trained machine learning process comprises a trained semantic segmentation machine learning process.

5. The apparatus of claim 1, wherein the second trained machine learning process comprises a trained instance segmentation machine learning process.

6. The apparatus of claim 1, wherein the second trained machine learning process comprises a trained panoptic segmentation machine learning process.

7. The apparatus of claim 1, wherein the first edge device includes one or more sensors that generate the respective sensor data for the first edge device, and wherein the message further causes the first edge device to:
   determine one or more discrepancies between one or more elements of the first respective ground truth data for the first edge device and one or more elements of the second respective ground truth data for the first edge device; and
   generate the respective dataset based on the one or more determined discrepancies.

8. The apparatus of claim 7, wherein the respective sensor data for the first edge device includes one or more images, the first respective ground truth data for the first edge device identifies one or more objects within a first image of the one or more images, and the second respective ground truth data for the first edge device identifies one or more objects within the first image, and wherein the message further causes the first edge device to determine the one or more discrepancies by comparing the one or more objects within the first image of the first respective ground truth data with the one or more objects of within the first image of the second respective ground truth data.

9. The apparatus of claim 8, wherein the message further causes the first edge device to:
   display the first image;
   receive, from an input unit communicatively coupled to the first edge device, response data in response to displaying the first image;
   update the first dataset based on the determined one or more discrepancies and the response data; and
   generate the respective dataset based on the updated first dataset.

10. The apparatus of claim 1, wherein the plurality of edge devices includes at least one vehicle.

11. The apparatus of claim 1, wherein the message causes the first edge device to:
   generate discrepancy data based on the first respective ground truth data for the first edge device and the second respective ground truth data for the first edge device; and
   transmit the discrepancy data to a second edge device of the plurality of edge devices, the second edge device being configured to perform operations that retrain the first trained machine learning process based in part on the discrepancy data.

12. The apparatus of claim 1, wherein the message causes the first edge device to:
- generate discrepancy data based on the first respective ground truth data for the first edge device and the second respective ground truth data for the first edge device; and
- transmit the discrepancy data to a second edge device of the plurality of edge devices, the second edge device being configured to perform operations that retrain the first trained machine learning process based in part on the discrepancy data and consistency data received from a third edge device.

13. The apparatus of claim 12, wherein the second edge device is a local datacenter.

14. A non-transitory, machine-readable storage medium storing instructions that, when executed by at least one processor of a server, cause the at least one processor to perform operations that include:
- obtaining, from a database, (i) a first dataset of a first trained machine learning process associated with a first type of object detection and recognition and (ii) a second dataset of a second trained machine learning process associated with a second type of object detection and recognition, the first dataset including at least a first value of a parameter of the first trained machine learning process;
- transmitting, to a first edge device and one or more other edge devices of a plurality of edge devices, a message including the first dataset and the second dataset, the message causing the first edge device and the one or more other edge devices to:
  - apply the first trained machine learning process to respective sensor data in accordance with the first dataset, the respective sensor data being associated with each edge device of the first edge device and the one or more other edge devices;
  - apply the second trained machine learning process to the respective sensor data in accordance with the second dataset;
  - perform operations that retrain the first trained machine learning process based in part on first respective ground truth data generated based on the application of the first trained machine learning process to the respective sensor data and second respective ground truth data generated based on the application of the second trained machine learning process to the respective sensor data, the retrained first trained machine learning process being associated with a second value of the parameter; and
  - generate a respective dataset including the second value of the parameter; receive, from the first edge device and the one or more other edge devices, the respective dataset including the second value of the parameter; and
- update the first dataset with the respective dataset received from the first edge device and the one or more other edge devices, an updated portion of the first dataset including the second value of the parameter.

15. A computer-implemented method by at least one processor, the computer-implemented method comprising:
- obtaining, by the at least one processor and from a database, (i) a first dataset of a first trained machine learning process associated with a first type of object detection and recognition and (ii) a second dataset of a second trained machine learning process associated with a second type of object detection and recognition, the first dataset including at least a first value of a parameter of the first trained machine learning process;
- transmitting, by the at least one processor and to a first edge device and one or more other edge devices of a plurality of edge devices, a message including the first dataset and the second dataset, the message causing the first edge device and the one or more other edge devices to:
  - apply the first trained machine learning process to respective sensor data in accordance with the first dataset, the respective sensor data being associated with each edge device of the first edge device and the one or more other edge devices;
  - apply the second trained machine learning process to the respective sensor data in accordance with the second dataset;
  - perform operations that retrain the first trained machine learning process based in part on first respective ground truth data generated based on the application of the first trained machine learning process to the respective sensor data and second respective ground truth data generated based on the application of the second trained machine learning process to the respective sensor data, the retrained first trained machine learning process being associated with a second value of the parameter; and
  - generate a respective dataset including the second value of the parameter;
- receive, by the at least one processor and from the first edge device and the one or more other edge devices, the third respective dataset including the second value of the parameter; and
- update the first dataset with the respective dataset received from the first edge device and the one or more other edge devices, an updated portion of the first dataset including the second value of the parameter.

16. The computer-implemented method of claim 15, further comprising:
- transmitting the updated first dataset to at least a second edge device of the plurality of edge devices.

17. The computer-implemented method of claim 15, wherein the first trained machine learning process comprises a trained, bounding box machine learning process.

18. The computer-implemented method of claim 15, wherein the second trained machine learning process comprises a trained semantic segmentation machine learning process.

19. The computer-implemented method of claim 15, wherein the second trained machine learning process comprises a trained instance segmentation machine learning process.

20. The computer-implemented method of claim 15, wherein the second trained machine learning process comprises a trained panoptic segmentation machine learning process.

21. The computer-implemented method of claim 15, wherein the first edge device includes one or more sensors that generate the respective sensor data for the first edge device, and wherein the message further causes the first edge device to:
- determine one or more discrepancies between one or more elements of the first respective ground truth data for the first edge device and one or more elements of the second respective ground truth data for the first edge device; and generate the respective dataset based on the one or more determined discrepancies.

22. The computer-implemented method of claim 21, wherein the respective sensor data for the first edge device includes one or more images, the first respective ground truth data for the first edge device identifies one or more objects within a first image of the one or more images, and the second respective ground truth data for the first edge device identifies one or more objects within the first image, and wherein the message further causes the first edge device to determine the one or more discrepancies by comparing the one or more objects within the first image of the first respective ground truth data with the one or more objects of within the first image of the second respective ground truth data.

23. The non-transitory, machine-readable storage medium of claim 14, wherein the instructions, when executed by the at least one processor, cause the at least one processor to perform operations that include:
  transmitting the updated first dataset to at least a second edge device of the plurality of edge devices.

24. The non-transitory, machine-readable storage medium of claim 14, wherein the first trained machine learning process comprises a trained, bounding box machine learning process.

25. The non-transitory, machine-readable storage medium of claim 14, wherein the second trained machine learning process comprises a trained semantic segmentation machine learning process.

26. The non-transitory, machine-readable storage medium of claim 14, wherein the second trained machine learning process comprises a trained instance segmentation machine learning process.

27. The non-transitory, machine-readable storage medium of claim 14, wherein the second trained machine learning process comprises a trained panoptic segmentation machine learning process.

28. The non-transitory, machine-readable storage medium of claim 14, wherein the first edge device includes one or more sensors that generate the respective sensor data for the first edge device, and wherein the message further causes the first edge device to:
  determine one or more discrepancies between one or more elements of the first respective ground truth data for the first edge device and one or more elements of the second respective ground truth data for the first edge device; and
  generate the respective dataset based on the one or more determined discrepancies.

* * * * *